US012696340B2

(12) United States Patent
    Li

(10) Patent No.: US 12,696,340 B2
(45) Date of Patent: Jul. 28, 2026

(54) TRANSMISSION CONFIGURATION INDICATOR (TCI) STATE CONFIGURATION METHOD AND APPARATUS

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 290 days.

(21) Appl. No.: 18/294,423

(22) PCT Filed: Aug. 5, 2021

(86) PCT No.: PCT/CN2021/111036
    § 371 (c)(1),
    (2) Date: Feb. 1, 2024

(87) PCT Pub. No.: WO2023/010471
    PCT Pub. Date: Feb. 9, 2023

(65) Prior Publication Data
    US 2024/0340989 A1       Oct. 10, 2024

(51) Int. Cl.
    *H04W 76/20*        (2018.01)
    *H04B 7/06*         (2006.01)
    (Continued)

(52) U.S. Cl.
    CPC .......... *H04W 76/20* (2018.02); *H04B 7/0626* (2013.01); *H04L 5/0051* (2013.01); *H04W 72/1273* (2013.01)

(58) Field of Classification Search
    CPC .. H04B 7/0626; H04B 7/06968; H04B 7/088; H04L 5/0051; H04L 5/0053; H04L 5/0094; H04W 72/1273; H04W 76/20
    See application file for complete search history.

(56) References Cited

U.S. PATENT DOCUMENTS

2021/0385832 A1* 12/2021 Zhang ................... H04L 5/0023
2023/0087280 A1*  3/2023 Zhang ................... H04L 5/0055
                                                          370/329

(Continued)

FOREIGN PATENT DOCUMENTS

CN        111586862 A      8/2020
CN        113170446 A      7/2021

OTHER PUBLICATIONS

First Office Action issued by the State Intellectual Property Office of People's Republic of China on Apr. 26, 2024, in corresponding Application No. CN 202180002483.7, 5 pages.

(Continued)

*Primary Examiner* — Kashif Siddiqui
(74) *Attorney, Agent, or Firm* — Finnegan, Henderson, Farabow, Garrett & Dunner, L.L.P.

(57) ABSTRACT

A method for configuring a transmission configuration indicator (TCI) state is performed by a terminal device. The method includes: receiving configuration information sent by a network device, wherein the configuration information includes at least one transmission configuration indicator state corresponding to at least one transmission configuration indicator codepoint; and acquiring a transmission configuration indicator state corresponding to a communication transmission according to the transmission configuration indicator codepoint.

20 Claims, 2 Drawing Sheets receiving configuration information sent by a network device, wherein the configuration information comprises at least one transmission configuration indicator state corresponding to at least one transmission configuration indicator codepoint  ~S201 acquiring a transmission configuration indicator state corresponding to a communication transmission according to the transmission configuration indicator codepoint  ~S202

(51) Int. Cl.
    *H04L 5/00*         (2006.01)
    *H04W 72/1273*    (2023.01)

(56)              References Cited

U.S. PATENT DOCUMENTS

2023/0121938 A1\*   4/2023  Zhou ................. H04B 7/06964
                                         375/347
2024/0063879 A1\*   2/2024  Zhou .................... H04L 5/0023

OTHER PUBLICATIONS

International Search Report and Written Opinion of International Application No. PCT/CN2021/111036, dated Mar. 30, 2022, 12 pages.
"Enhancement on multi-beam operation", Futurewei, 3GPP TSG-Ran WG1 Meeting #105-e, R1-2104205, e- Meeting, May 19-May 27, 2021, 11 pages.
"Enhancement on multi-beam operation", MediaTek Inc., 3GPP TSG RAN WG1 #105-e, R1-2105353, e-Meeting, May 10-May 27, 2021, 28 pages.
"Enhancements to Multi-Beam Operation", Intel Corporation, 3GPP TSG RAN WG1 #105-e, R1-2104888, e-Meeting, May 19-May 27, 2021, 27 pages.
Extended European Search Report Issued in Application No. 21952355.2 dated Aug. 29, 2024, 14 pages.

\* cited by examiner

TRANSMISSION CONFIGURATION INDICATOR (TCI) STATE CONFIGURATION METHOD AND APPARATUS

CROSS-REFERENCE TO RELATED APPLICATION

This application is a U.S. national phase application of International Application No. PCT/CN2021/111036, filed Aug. 5, 2021, the entire contents of which are incorporated herein by reference.

TECHNICAL FIELD

The present disclosure generally relates to the field of communication, and more particularly, to a method and apparatus for configuring a transmission configuration indicator (TCI) state.

BACKGROUND

In wireless communication, signals are sent and received between a terminal device and a network device through beams. In related art, transmission configuration indicator (TCIs) corresponding to the beams are indicated through a medium access control (MAC) control element (CE) or a downlink control information (DCI) signaling. However, this method takes up more resources.

At present, there is still a lack of effective method for indicating beams.

SUMMARY

In a first aspect, embodiments of the present disclosure provide a method for configuring a transmission configuration indicator (TCI) state. The method includes: receiving configuration information sent by a network device, in which the configuration information includes at least one transmission configuration indicator state corresponding to at least one transmission configuration indicator codepoint: and acquiring a transmission configuration indicator state corresponding to a communication transmission according to the transmission configuration indicator codepoint.

In a second aspect, embodiments of the present disclosure provide another method for configuring a transmission configuration indicator (TCI) state, which is performed by a network device, and includes: sending configuration information to a terminal device. The configuration information includes at least one transmission configuration indicator state corresponding to at least one transmission configuration indicator codepoint.

In a third aspect, embodiments of the present disclosure provide a communication device, which includes a processor: and a memory having stored therein a computer program. The processor is configured to execute the computer program stored in the memory to cause the communication device to perform the method as described in the first aspect above.

In a fourth aspect, embodiments of the present disclosure provide a communication device, which includes a processor: and a memory having stored therein a computer program. The processor is configured to execute the computer program stored in the memory to cause the communication device to perform the method as described in the second aspect above.

In a fifth aspect, embodiments of the present disclosure provide a non-transitory computer-readable storage medium having stored therein an instruction. The instruction, when executed, causes the terminal device to perform the method as described in the first aspect above.

In a sixth aspect, embodiments of the present disclosure provide a non-transitory readable storage medium having stored therein an instruction. The instruction, when executed, causes the network device to perform the method as described in the second aspect above.

BRIEF DESCRIPTION OF THE DRAWINGS

The accompanying drawings of the present disclosure are briefly described below.

DETAILED DESCRIPTION

For ease of understanding, terms involved in the present disclosure are firstly introduced.

1. Downlink Control Information (DCI)

The DCI is carried by a physical downlink control channel (PDCCH), and the DCI may include uplink and downlink resource allocation, hybrid automatic repeat request (HARQ) information, power control, and so on. The PDCCH is a kind of physical channel for carrying downlink scheduling information.

2. Transmission Configuration Indicator (TCI)

The TCI is used to inform a user to use a receiving beam which is the same as that for receiving a certain synchronization signal block (SSB) or a certain channel state information reference signal (CSI-RS) sent by a base station to receive a PDCCH or a physical downlink shared channel (PDSCH); or inform the user to use a sending beam which is the same as that for sending a certain reference signal, such as a sounding reference signal (SRS), or a sending beam corresponding to a receiving beam for receiving the channel state information reference signal (CSI-RS) to send a physical uplink control channel (PUCCH)/physical uplink shared channel (PUSCH).

3. Media Access Control Layer Control Element (MAC CE)

The media access control layer control element (MAC CE) is a way to exchange control information between a terminal and a network. As the name implies, it is used to exchange control information about the MAC layer.

4. Reference Signal (RS)

The reference signal is an important component in the new radio (NR), and the RS includes a positioning reference signal (PRS) and a tracking reference signal (TRS). The PRS can be used as a reference for positioning, and the TRS can be used as a reference for tracking.

In order to better understand a method for configuring a transmission configuration indicator (TCI) state as disclosed in embodiments of the present disclosure, a communication system to which embodiments of the present disclosure is applicable is firstly described below.

Figure 1:
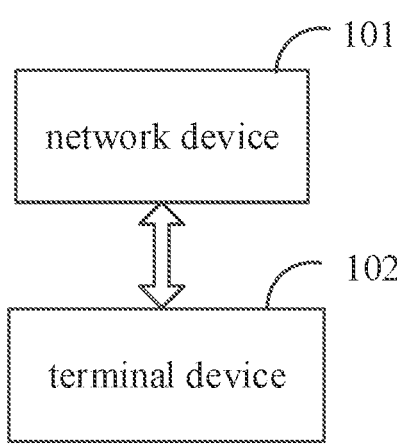
FIG. 1 is a schematic architecture diagram of a communication system according to embodiments of the present disclosure.

Referring to FIG. 1, which is a schematic architecture diagram of a communication system according to embodiments of the present disclosure, the communication system may include, but is not limited to, a network device and a terminal device. The number and form of the devices shown in FIG. 1 are only as examples, and do not constitute a limitation to embodiments of the present disclosure. In practical, two or more network device, and two or more terminal device may be included. As an example, the communication system shown in FIG. 1 includes one network device 101 and one terminal device 102.

It should be noted that the technical solutions of embodiments of the present disclosure may be applied to various communication systems, for example, a long term evolution (LTE) system, a 5th generation (5G) mobile communication system, a 5G new radio (NR) system, or other new mobile communication systems in the future. It should also be noted that the sidelink in embodiments of the present disclosure may also be referred to as a side link or a direct communications link.

The network device 101 in embodiments of the present disclosure is an entity at a network side for transmitting or receiving signals. For example, the network device 101 may be an evolved NodeB (eNB), a transmission reception point (TRP), a next generation NodeB (gNB) in an NR system, a base station in other future mobile communication systems, an access node in a wireless fidelity (WiFi) system, or the like. Embodiments of the present disclosure do not limit the specific technology and specific device form adopted by the network device. The network device provided by embodiments of the present disclosure may be composed of a central unit (CU) and distributed units (DU). The CU may also be called a control unit. The CU-DU structure allows to split a protocol layer of the network device, such as the base station, a part of functions of the protocol layer is centrally controlled in the CU, some or all of the remaining functions of the protocol layer are distributed in the DUs, and the CU centrally controls the DUs.

The terminal device 102 in embodiments of the present disclosure is an entity at a terminal side for receiving or transmitting signals, such as a mobile phone. The terminal device may also be called a terminal, a user equipment (UE), a mobile station (MS), a mobile terminal (MT), and so on. The terminal device may be a device with a communication function, such as a car, a smart car, a mobile phone, a wearable device, a tablet Pad, a computer with a wireless transceiving function, a virtual reality (VR) terminal device, an augmented reality (AR) terminal device, a wireless terminal device in an industrial control, a wireless terminal device in self-driving, a wireless terminal device in a remote medical surgery, a wireless terminal device in a smart grid, a wireless terminal device in a transportation safety, a wireless terminal device in a smart city, a wireless terminal device in a smart home, etc. Embodiments of the present disclosure do not limit the specific technology and the specific device form adopted by the terminal device.

In Rel-16, beams of PDCCH, PDSCH, PUSCH, PUCCH and various uplink and downlink reference signals are separately indicated, and the PDCCH and PUCCH use an MAC CE to activate a beam, while the PDSCH and PUSCH indicate their respective beams according to a DCI signaling. Currently, in order to reduce signaling overhead, it is desired to use a unified transmission configuration indicator state (unified TCI state). That is, a unified TCI state is used to indicate beams corresponding to various channels and/or reference signals in a set. At present, for uplink and downlink, the unified TCI state may be separately indicated. That is, a separate downlink transmission configuration indicator state (separate DL TCI state) is used for beam indication of a downlink communication, and/or a separate uplink transmission configuration indicator state (separate UL TCI state) is used for beam indication of an uplink communication. Alternatively, the uplink and downlink are indicated jointly, that is, a joint transmission configuration indicator state (joint TCI state) is used. The joint TCI state is used for the beam indication of both the uplink and the downlink. In other words, if a base station indicates a separate DL TCI state for the downlink, the TCI state may be used for a PDSCH, all or some of PDCCHs (such as a UE dedicated PDCCH), and/or at least one of downlink reference signals (such as CSI-RS. SSB. PRS. TRS) of a terminal: if a base station indicates a separate UL TCI state for the uplink, the TCI state may be used for a PUSCH, all or some of PUCCHs and/or PRACHs, and/or at least one of uplink reference signals (such as SRS, scheduling request) of a terminal. If a base station indicates a joint TCI state, the joint TCI state may be used for uplink and downlink channels and/or reference signals of a terminal.

It can be understood that the communication system described in embodiments of the present disclosure is aimed to illustrate the technical solution of embodiments of the present disclosure more clearly, and does not constitute a limitation to the technical solutions of embodiments of the present disclosure. Those of ordinary skill in the art will understood that with the evolution of the system architecture and the emergence of new service scenarios, the technical solutions according to embodiments of the present disclosure are also applicable to similar technical problems.

Embodiments of the present application provide a method and apparatus for configuring a transmission configuration indicator (TCI) state, which may be applied to a global system of mobile communication (GSM), a 5G New Radio (NR) system, an LTE frequency division duplex (FDD) system, etc. A transmission configuration indicator state corresponding to a communication transmission is acquired through configuration information sent by a network device, thereby saving resources and avoiding the waste of resources.

In a first aspect, embodiments of the present disclosure provide a method for configuring a transmission configuration indicator (TCI) state. The method includes: receiving configuration information sent by a network device, in which the configuration information includes at least one transmission configuration indicator state corresponding to at least one transmission configuration indicator codepoint: and acquiring a transmission configuration indicator state corresponding to a communication transmission according to the transmission configuration indicator codepoint.

The transmission configuration indicator state corresponding to the communication transmission is acquired according to the configuration information sent by the network device, and multiple transmission configuration indicator states may be acquired according to one configuration information. In this way, signaling resources are saved, thereby avoiding waste of resources.

In some embodiments, the configuration information further includes: first indication information. The first indication information is configured to indicate that all elements in the at least one transmission configuration indicator codepoint correspond to joint transmission configuration indicators, or the first indication information is configured to indicate that all elements in the at least one transmission configuration indicator codepoint correspond to separate transmission configuration indicators. The separate transmission configuration indicator includes at least one of a separate uplink transmission configuration indicator or a separate downlink transmission configuration indicator.

In some embodiments, the configuration information further includes: second indication information. The second indication information is configured to indicate that each element in the at least one transmission configuration indicator codepoint corresponds to a joint transmission configuration indicator or a separate transmission configuration indicator. The separate transmission configuration indicator includes at least one of a separate uplink transmission configuration indicator or a separate downlink transmission configuration indicator.

In some embodiments, the second indication information includes N indication fields, wherein an $i^{th}$ indication field is configured to indicate that an it transmission configuration indicator codepoint corresponds to a joint transmission configuration indicator or a separate transmission configuration indicator, and N represents a number of activated transmission configuration indicator codepoints included in the configuration information.

In some embodiments, acquiring the transmission configuration indicator state corresponding the communication transmission according to the transmission configuration indicator codepoint includes: acquiring the transmission configuration indicator state according to the first indication information and/or the second indication information.

In some embodiments, acquiring the transmission configuration indicator state according to the first indication information and/or the second indication information includes: acquiring the transmission configuration indicator state according to the first indication information and/or the second indication information, and at least one of a first transmission configuration indication field, a second transmission configuration indication field, a first information indication field or a second information indication field corresponding to a first codepoint.

In some embodiments, acquiring the transmission configuration indicator state according to the first indication information and/or the second indication information, and at least one of the first transmission configuration indication field, the second transmission configuration indication field, the first information indication field or the second information indication field corresponding to the first codepoint includes:

determining that the first codepoint corresponds to the joint transmission configuration indicator according to the first indication information and/or the second indication information, determining that the first information indication field corresponding to the first transmission configuration indication field included in the first codepoint indicates that the first transmission configuration indication field is in a displayed state, determining that the second information indication field corresponding to the second transmission configuration indication field included in the first codepoint indicates that the second transmission configuration indication field is in a non-displayed state, and acquiring the transmission configuration indicator state according to a first transmission configuration indicator state displayed in the first transmission configuration indication field: or determining that the first codepoint corresponds to the joint transmission configuration indicator according to the first indication information and/or the second indication information, determining that the first information indication field corresponding to the first transmission configuration indication field included in the first codepoint indicates that the first transmission configuration indication field is in a non-displayed state, determining that the second information indication field corresponding to the second transmission configuration indication field included in the first codepoint indicates that the second transmission configuration indication field is in a displayed state, and acquiring the transmission configuration indicator state according to a second transmission configuration indicator state displayed in the second transmission configuration indication field.

In some embodiments, the first transmission configuration indicator state or the second transmission configuration indicator state is a transmission configuration indicator state in a joint transmission configuration indicator state pool, and the transmission configuration indicator state in the joint transmission configuration indicator state pool is applicable to an uplink communication transmission and a downlink communication transmission.

In some embodiments, acquiring the transmission configuration indicator state according to the first indication information and/or the second indication information, and at least one of the first transmission configuration indication field, the second transmission configuration indication field, the first information indication field or the second information indication field corresponding to the first codepoint includes:

determining that the first codepoint corresponds to the separate transmission configuration indicator according to the first indication information and/or the second indication information, determining that the first information indication field corresponding to the first transmission configuration indication field included in the first codepoint indicates that the first transmission configuration indication field is in a displayed state, determining that the second information indication field corresponding to the second transmission configuration indication field included in the first codepoint indicates that the second transmission configuration indication field is in a non-displayed state, and acquiring the transmission configuration indicator state according to a first transmission configuration indicator state displayed in the first transmission configuration indication field: or determining that the first codepoint corresponds to the separate transmission configuration indicator according to the first indication information and/or the second indication information, determining that the first information indication field corresponding to the first transmission configuration indication field included in the first codepoint indicates that the first transmission configuration indication field is in a non-displayed state, determining that the second information indication field corresponding to the second transmission configuration indication field included in the first codepoint indicates that the second transmission configuration indication field is in a displayed state, and acquiring the transmission configuration indicator state according to a second transmission configuration indicator state displayed in the second transmission configuration indication field: or determining that the first codepoint corresponds to the separate transmission configuration indicator according to the first indication information and/or the second indication information, determining that the first information indication field corresponding to the first transmission configuration indication field included in the first codepoint indicates that the first transmission configuration indication field is in a displayed state, determining that the second information indication field corresponding to the second transmission configuration indication field included in the first codepoint indicates that the second transmission configuration indication field is in a displayed state, and acquiring the transmission configuration indicator state according to a first transmission configuration indicator state displayed in the first transmission configuration indication field and a second transmission configuration indicator state displayed in the second transmission configuration indication field.

In some embodiments, the first transmission configuration indicator state is a transmission configuration indicator state in a separate downlink transmission configuration indicator state pool, and the second transmission configuration indicator state is a transmission configuration indicator state in a separate uplink transmission configuration indicator state pool. The transmission configuration indicator state in the separate downlink transmission configuration indicator state is applicable to a downlink communication transmission, and the transmission configuration indicator state in the separate uplink transmission configuration indicator state pool is applicable to an uplink communication transmission.

In some embodiments, the first transmission configuration indicator state is a transmission configuration indicator state in a separate uplink transmission configuration indicator state pool, and the second transmission configuration indicator state is a transmission configuration indicator state in a separate downlink transmission configuration indicator state pool.

In some embodiments, the communication transmission includes at least one of a downlink communication transmission or an uplink communication transmission.

The downlink communication transmission includes at least one of: a physical downlink control channel (PDCCH) transmission, a physical downlink shared channel (PDSCH) transmission, a physical broadcast channel (PBCH) transmission, a synchronization signal block (SSB) transmission, a channel state information reference signal (CSI-RS) transmission, a demodulation reference signal (DMRS) transmission, or a positioning reference signal (PRS) transmission.

The uplink communication transmission includes at least one of: a physical uplink control channel (PUCCH) transmission, a physical uplink shared channel (PUSCH) transmission, a physical random access channel (PRACH) transmission, a sounding reference signal (SRS) transmission, or a demodulation reference signal (DMRS) transmission.

In some embodiments, the separate downlink transmission configuration indicator state pool, the separate uplink transmission configuration indicator state pool, and the joint transmission configuration indicator state pool are different from one another, or at least two of the separate downlink transmission configuration indicator state pool, the separate uplink transmission configuration indicator state pool, and the joint transmission configuration indicator state pool are the same.

In some embodiments, the configuration information includes a media access control (MAC) control element (CE).

In some embodiments, acquiring the transmission configuration indicator state corresponding the communication transmission according to the transmission configuration indicator codepoint includes: receiving downlink control information (DCI) from the network device, and determining the transmission configuration indicator codepoint according to the DCI.

In a second aspect, embodiments of the present disclosure provide another method for configuring a transmission configuration indicator (TCI) state, which is performed by a network device, and includes: sending configuration information to a terminal device. The configuration information includes at least one transmission configuration indicator state corresponding to at least one transmission configuration indicator codepoint.

The transmission configuration indicator state corresponding to the communication transmission is acquired according to the configuration information sent by the network device, and multiple transmission configuration indicator states may be acquired according to one configuration information. In this way, signaling resources are saved, thereby avoiding waste of resources.

In some embodiments, the configuration information further includes first indication information. The first indication information is configured to indicate that all elements in the at least one transmission configuration indicator codepoint correspond to joint transmission configuration indicators, or the first indication information is configured to indicate that all elements in the at least one transmission configuration indicator codepoint correspond to separate transmission configuration indicators. The separate transmission configuration indicator includes at least one of a separate uplink transmission configuration indicator or a separate downlink transmission configuration indicator.

In some embodiments, the configuration information further includes second indication information. The second indication information is configured to indicate that each element in the at least one transmission configuration indicator codepoint corresponds to a joint transmission configuration indicator or a separate transmission configuration indicator. The separate transmission configuration indicator includes at least one of a separate uplink transmission configuration indicator or a separate downlink transmission configuration indicator.

Embodiments of the present disclosure provide a communication device, which has part or all of functions of the terminal device for implementing the method as described in the first aspect above. For example, the communication device may have functions as described in some or all the embodiments in the present disclosure, or may also have functions to separately implement any of embodiments in the present disclosure. The functions may be implemented by a hardware, or may be implemented by executing a corresponding software on the hardware. The hardware or the software includes one or more elements or modules corresponding to the above functions.

In an implementation, a structure of the communication device may include: a transceiving module and a processing module. The processing module is configured to support the communication device to perform corresponding functions in the foregoing methods. The transceiving module is configured to support a communication between the communication device and other device. The communication device may further include a storage module, which is configured to be coupled with the transceiving module and the processing module, and store necessary computer programs and data of the communication device.

In an implementation, the communication device includes: a receiving module and an indicator state acquiring module. The receiving module is configured to receive configuration information sent by a network device. The configuration information includes at least one transmission configuration indicator state corresponding to at least one transmission configuration indicator codepoint. The indicator state acquiring module is configured to acquire a transmission configuration indicator state corresponding to a communication transmission according to the transmission configuration indicator codepoint.

The transmission configuration indicator state corresponding to the communication transmission is acquired according to the configuration information sent by the network device, and multiple transmission configuration indicator states may be acquired according to one configuration information. In this way, signaling resources are saved, thereby avoiding waste of resources.

Embodiments of the present disclosure provide another communication device, which has part or all of functions of the network device for implementing the method embodiments as described in the second aspect above. For example, the communication device may have functions as described in some or all the embodiments in the present disclosure, or may also have functions to separately implement any of embodiments in the present disclosure. The functions may be implemented by a hardware, or may be implemented by executing a corresponding software on the hardware. The hardware or the software includes one or more elements or modules corresponding to the above functions.

In an implementation, a structure of the communication device may include: a transceiving module and a processing module. The processing module is configured to support the communication device to perform corresponding functions in the foregoing methods. The transceiving module is configured to support a communication between the communication device and other device. The communication device may further include a storage module, which is configured to be coupled with the transceiving module and the processing module, and store necessary computer programs and data of the communication device.

In an implementation, the communication device includes a configuration information sending module. The configuration information sending module is configured to send configuration information to a terminal device. The configuration information includes at least one transmission configuration indicator state corresponding to at least one transmission configuration indicator codepoint.

The transmission configuration indicator state corresponding to the communication transmission is acquired according to the configuration information sent by the network device, and multiple transmission configuration indicator states may be acquired according to one configuration information. In this way, signaling resources are saved, thereby avoiding waste of resources.

Embodiments of the present disclosure provide a communication device. The communication device includes a processor, and the processor is configured to perform the method as described in the first aspect above when invoking a computer program in a memory.

The transmission configuration indicator state corresponding to the communication transmission is acquired according to the configuration information sent by the network device, and multiple transmission configuration indicator states may be acquired according to one configuration information. In this way, signaling resources are saved, thereby avoiding waste of resources.

Embodiments of the present disclosure provide a communication device. The communication device includes a processor, and the processor is configured to perform the method as described in the second aspect above when invoking a computer program in a memory.

The transmission configuration indicator state corresponding to the communication transmission is acquired according to the configuration information sent by the network device, and multiple transmission configuration indicator states may be acquired according to one configuration information. In this way, signaling resources are saved, thereby avoiding waste of resources.

Embodiments of the present disclosure provide a communication device, which includes a processor: and a memory having stored therein a computer program. The processor is configured to execute the computer program stored in the memory to cause the communication device to perform the method as described in the first aspect above.

Embodiments of the present disclosure provide a communication device, which includes a processor: and a memory having stored therein a computer program. The processor is configured to execute the computer program stored in the memory to cause the communication device to perform the method as described in the second aspect above.

Embodiments of the present disclosure provide a communication device, which includes a processor and an interface circuit. The interface circuit is configured to receive s code instruction and transmit the code instruction to the processor. The processor is configured to run the code instruction to cause the communication device to perform the method as described in the first aspect above.

Embodiments of the present disclosure provide a communication device, which includes a processor and an interface circuit. The interface circuit is configured to receive a code instruction and transmit the code instruction to the processor. The processor is configured to run the code instruction to cause the communication device to perform the method as described in the second aspect above.

Embodiments of the present disclosure provide a system for configuring a transmission configuration indicator (TCI) state. The system includes the communication device as described in the third aspect and the communication device as described in the fourth aspect. Alternatively, the system includes the communication device as described in the fifth aspect and the communication device described in the sixth aspect. Alternatively, the system includes the communication device as described in the seventh aspect and the communication device described in the eighth aspect. Alternatively, the system includes the communication device as described in the ninth aspect and the communication device described in the tenth aspect.

Embodiments of the present disclosure provide a non-transitory computer-readable storage medium having stored therein an instruction for using by the above-mentioned terminal device. The instruction, when executed, causes the terminal device to perform the method as described in the first aspect above.

Embodiments of the present disclosure provide a non-transitory readable storage medium having stored therein an instruction for using by the above-mentioned network device. The instruction, when executed, causes the network device to perform the method as described in the second aspect above.

Embodiments of the present disclosure further provide a computer program product, which includes a computer program that, when run on a computer, causes the computer to perform the method as described in the first aspect above.

Embodiments of the present disclosure further provide a computer program product, which includes a computer program that, when run on a computer, causes the computer to perform the method as described in the second aspect above.

Embodiments of the present disclosure provide a chip system, which includes at least one processor and an interface, for supporting a terminal device to implement functions involved in the first aspect, for example, to determine or process at least one of data and information involved in the above method. In a possible design, the chip system further includes a memory for storing necessary computer programs and data of the terminal device. The chip system may consist of chips, or may include chips and other discrete devices.

Embodiments of the present disclosure provide a chip system, which includes at least one processor and an interface, for supporting a network device to implement functions involved in the second aspect, for example, to determine or process at least one of data and information involved in the above method. In a possible design, the chip system further includes a memory for storing necessary computer programs and data of the network device. The chip system may consist of chips, or may include chips and other discrete devices.

Embodiments of the present disclosure provide a computer program that, when run on a computer, causes the computer to perform the method as described in the first aspect above.

Embodiments of the present disclosure provide a computer program that, when run on a computer, causes the computer to perform the method as described in the second aspect above.

Methods and apparatuses for configuring a transmission configuration indicator (TCI) state provided by the present disclosure will be described in detail below with reference to the accompanying drawings.

Figure 2:
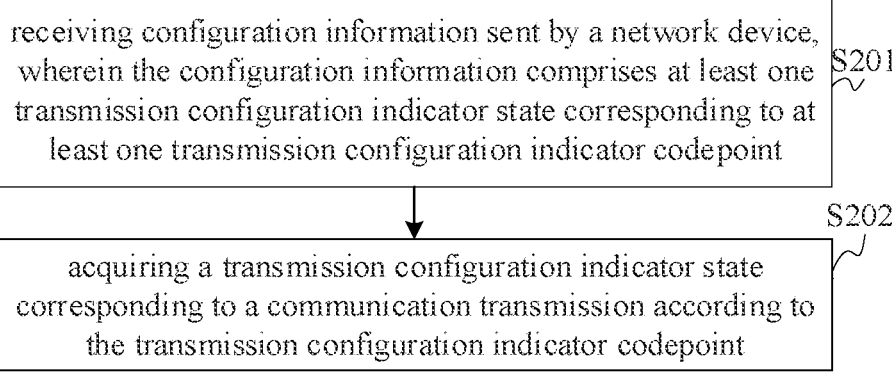
FIG. 2 is a schematic flowchart of a method for configuring a transmission configuration indicator (TCI) state according to embodiments of the present disclosure.

Please refer to FIG. 2, which is a schematic flowchart of a method for configuring a transmission configuration indicator (TCI) state according to embodiments of the present disclosure. Embodiments of the present disclosure here are performed by a terminal device. As shown in FIG. 2, the method may include but is not limited to following steps.

In step S201, configuration information sent by a network device is received. The configuration information includes at least one transmission configuration indicator state corresponding to at least one transmission configuration indicator codepoint.

In embodiments of the present disclosure, the terminal device may receive the configuration information sent by the network device, and the network device may send the configuration information to the terminal device. The configuration information is configured to indicate a transmission configuration indicator corresponding to an element in the at least one transmission configuration indicator codepoint (TCI codepoint), and the transmission configuration indicator includes at least one of a joint transmission configuration indicator or a separate transmission configuration indicator. The separate transmission configuration indicator includes at least one of a separate uplink transmission configuration indicator or a separate downlink transmission configuration indicator.

In step S202, a transmission configuration indicator state corresponding to a communication transmission is acquired according to the transmission configuration indicator codepoint.

In embodiments of the present disclosure, the terminal is pre-configured with a transmission configuration indicator (TCI) state pool, and by taking advantage of the transmission configuration indicator codepoint, the terminal may acquire the transmission configuration indicator state (TCI state) corresponding to the communication transmission according to the codepoint. The TCI state is a TCI state in the TCI state pool.

By implementing embodiments of the present disclosure, the transmission configuration indicator state corresponding to the communication transmission may be acquired according to the configuration information sent by the network device, and multiple transmission configuration indicator states corresponding to multiple transmission configuration indicator codepoints may be acquired according to one configuration information. In this way, signaling resources are saved, thereby avoiding waste of resources.

The configuration information sent by the network device is received, and the transmission configuration indicator state corresponding to the communication transmission is acquired according to the transmission configuration indicator codepoint: and the configuration information further includes first indication information.

The first indication information is configured to indicate that all elements in the at least one transmission configuration indicator codepoint correspond to joint transmission configuration indicators. Alternatively, the first indication information is configured to indicate that all elements in the at least one transmission configuration indicator codepoint correspond to separate transmission configuration indicators. The separate transmission configuration indicator includes at least one of a separate uplink transmission configuration indicator or a separate downlink transmission configuration indicator.

In embodiments of the present disclosure, the codepoints are as shown in Table 1, where R represents a reserved bit. The first indication information may reuse the reserved bit R, or a new bit is introduced for the first indication information. If the terminal device receives the first indication information, all elements in the codepoints correspond to joint transmission configuration indicators, or all elements in the codepoints correspond to separate transmission configuration indicators. For example, if the bit of the first indication information is displayed as "0", it means that TCIs corresponding to all TCI codepoints activated in an MAC CE are joint TCIs: if the bit of the first indication information is displayed as "1", it means that the TCIs corresponding to all TCI codepoints activated in the MAC CE are separate TCIs. Alternatively, for example, if the bit of the first indication information is displayed as "1", it means that TCIs corresponding to all TCI codepoints activated in the MAC CE are joint TCIs: if the bit of the first indication information is displayed as "0". it means that the TCIs corresponding to all TCI codepoints activated in the MAC CE are separate TCIs. The separate transmission configuration indicator includes at least one of the separate uplink transmission configuration indicator or the separate downlink transmission configuration indicator.

TABLE 1

| R | serving cell ID | bandwidth portion ID |
|---|---|---|
| $C_{0,1}$ | | $TCI_{0,1}$ |
| $C_{0,2}$ | | $TCI_{0,2}$ |
| . . . | | . . . |
| $C_{N,1}$ | | $TCI_{N,1}$ |
| $C_{N,2}$ | | $TCI_{N,2}$ |

In Table 1, $C_{N,1}$ represents a first information indication field, and $C_{N,2}$ represents a second information indication field. The $C_{N,1}$ corresponds to a first transmission configuration indication field $TCI_{N,1}$ corresponding to an $N^{th}$ TCI codepoint, and the $C_{N,2}$ corresponds to a second transmission configuration indication field $TCI_{N,2}$ corresponding to the $N^{th}$ TCI codepoint. By implementing embodiments of the present disclosure, it is possible to use one MAC CE configuration information to indicate that the transmission configuration indicators corresponding to all elements in the TCI codepoints, i.e., all TCI codepoints, are joint TCIs or independent TCIs, which saves signaling resources, and is beneficial to avoiding waste of resources.

The configuration information sent by the network device is received, and the transmission configuration indicator state corresponding to the communication transmission is acquired according to the transmission configuration indicator codepoint: and the configuration information further includes second indication information.

The second indication information is configured to indicate that each element in the at least one transmission configuration indicator codepoint corresponds to a joint transmission configuration indicator or a separate transmission configuration indicator. The separate transmission configuration indicator includes at least one of a separate uplink transmission configuration indicator or a separate downlink transmission configuration indicator.

In embodiments of the present disclosure, the codepoints are as shown in Table 2, where R represents a reserved bit. The configuration information includes N+1 TCI codepoints, that is, $TCI_{i,1}$ and $TCI_{i,2}$ correspond to a TCI codepoint i. For example, $TCI_{0,1}$ and $TCI_{0,2}$ correspond to a TCI codepoint 0. Therefore, the second indication information includes N+1 indication fields, i.e., $C_0$, $C_1$, . . . , $C_{N-1}$, $C_N$. An $i^{th}$ indication field is configured to indicate that an $i^{th}$ transmission configuration indicator codepoint corresponds to a joint transmission configuration indicator or a separate transmission configuration indicator. For example, if $C_i$ is displayed as "0", it means that a TCI corresponding to a TCI codepoint i is a joint TCI, if $C_i$ is displayed as "1", it means that the TCI corresponding to the TCI codepoint i is a separate TCI. Alternatively, for example, if $C_i$ is displayed as "1", it means that the TCI corresponding to the TCI codepoint i is a joint TCI, if $C_i$ is displayed as "0", it means that the TCI corresponding to the TCI codepoint i is a separate TCI. If the terminal device receives the second indication information, the terminal determines that each element in the TCI codepoints, i.e., each TCI codepoint, corresponds to a separate transmission configuration indicator or a joint transmission configuration indicator. The separate transmission configuration indicator includes at least one of a separate uplink transmission configuration indicator or a separate downlink transmission configuration indicator.

TABLE 2

| R $C_0$ | serving cell ID $C_1$ | . . . | bandwidth portion ID $C_{N-1}$ | $C_N$ |
|---|---|---|---|---|
| $C_{0,1}$ | | | $TCI_{0,1}$ | |
| $C_{0,2}$ | | | $TCI_{0,2}$ | |
| . . . | | | . . . | |
| $C_{N,1}$ | | | $TCI_{N,1}$ | |
| $C_{N,2}$ | | | $TCI_{N,2}$ | |

In Table 2, $C_{N,1}$ represents a first information indication field, and $C_{N,2}$ represents a second information indication field. The $C_{N,1}$ corresponds to a first transmission configuration indication field $TCI_{N,1}$ corresponding to an $N^{th}$ TCI codepoint, and the $C_{N,2}$ corresponds to a second transmission configuration indication field $TCI_{N,2}$ corresponding to the $N^{th}$ TCI codepoint. The Nis an integer greater than or equal to 0.

By implementing embodiments of the present disclosure, it is possible to use a plurality of indication fields contained in one indication information to respectively indicate the transmission configuration indicator corresponding to each element in the TCI codepoints, which improves flexibility.

In some embodiments, the second indication information includes N indication fields, where the $i^{th}$ indication field is configured to indicate that the $i^{th}$ transmission configuration indicator codepoint corresponds to a joint transmission configuration indicator or a separate transmission configuration indicator, and the N represents a number of activated transmission configuration indicator codepoints included in the configuration information. The indication field may be used to indicate that the TCI corresponding to an element in the codepoints is a separate transmission configuration indicator (separate TCI) and/or a joint transmission configuration indicator (joint TCI).

At least one of the following items of the configuration information in embodiments of the present disclosure is specific to one TRP: the first indication information, the second indication information, or the first transmission configuration indication field, the second transmission configuration indication field, the first information indication field and the second information indication field corresponding to each TCI codepoint.

If there are multiple TRPs, the configuration information includes at least one of the following items for each TRP: the first indication information, the second indication information, or the first transmission configuration indication field, the second transmission configuration indication field, the first information indication field and the second information indication field corresponding to each TCI codepoint.

In embodiments of the present disclosure, the transmission configuration indicator type corresponding to the respective TCI codepoint is determined according to the indication field, so as to further determine the stransmission configuration indicator state.

In some embodiments, acquiring the transmission configuration indicator state corresponding the communication transmission according to the transmission configuration indicator codepoint includes: acquiring the transmission configuration indicator state according to the first indication information and/or the second indication information.

In some embodiments, acquiring the transmission configuration indicator state according to the first indication information and/or the second indication information includes: acquiring the transmission configuration indicator state according to the first indication information and/or the second indication information, and at least one of a first transmission configuration indication field, a second transmission configuration indication field, a first information indication field or a second information indication field corresponding to a first codepoint.

In embodiments of the present disclosure, whether the transmission configuration indicator in the corresponding first codepoint is a joint transmission configuration indicator or a separate transmission configuration indicator may be acquired according to the first indication information and/or the second indication information, and the transmission configuration indicator state (TCI state) may be acquired according to the first information indication field, and/or the second information indication field, and/or the first transmission configuration indication field, and/or the second transmission configuration indication field.

At least one of the following items of the configuration information in embodiments of the present disclosure is specific to one TRP: the first indication information, the second indication information, or the first transmission configuration indication field, the second transmission configuration indication field, the first information indication field and the second information indication field corresponding to each TCI codepoint.

If there are multiple TRPs, the configuration information includes at least one of the following items for each TRP: the first indication information, the second indication information, or the first transmission configuration indication field, the second transmission configuration indication field, the first information indication field and the second information indication field corresponding to each TCI codepoint.

By implementing embodiments of the present disclosure, it is possible to acquire whether the transmission configuration indicator in the corresponding first codepoint is a joint transmission configuration indicator or a separate transmission configuration indicator according to the first indication information and/or the second indication information, and to further acquire the transmission configuration indicator state (TCI state) according to the first information indication field, and/or the second information indication field, and/or the first transmission configuration indication field, and/or the second transmission configuration indication field, which saves signaling resources, and is beneficial to avoiding waste of resources.

Acquiring the transmission configuration indicator state according to the first indication information and/or the second indication information includes: acquiring the transmission configuration indicator state according to the first indication information and/or the second indication information, and at least one of the first transmission configuration indication field, the second transmission configuration indication field, the first information indication field or the second information indication field corresponding to the first codepoint, which includes at any of following steps: step A1, determining that the first codepoint corresponds to the joint transmission configuration indicator according to the first indication information and/or the second indication information, determining that the first information indication field corresponding to the first transmission configuration indication field included in the first codepoint indicates that the first transmission configuration indication field is in a displayed state, determining that the second information indication field corresponding to the second transmission configuration indication field included in the first codepoint indicates that the second transmission configuration indication field is in a non-displayed state, and acquiring the transmission configuration indicator state according to a first transmission configuration indicator state displayed in the first transmission configuration indication field.

In embodiments of the present disclosure, the first indication information and/or the second indication information indicate that the first codepoint corresponds to the joint transmission configuration indicator (joint TCI). Further, according to the first information indication field, and/or the second information indication field, and/or the first transmission configuration indication field, and/or the second transmission configuration indication field corresponding to the first codepoint, the transmission configuration indicator state (TCI state) may be acquired. The first information indication field is configured to indicate that the corresponding first transmission configuration indication field is in a displayed state. The corresponding transmission configuration indicator state (TCI state) is acquired according to the first transmission configuration indicator state displayed in the first transmission configuration indication field.

In some embodiments, the $N^{th}$ codepoint in Table 1 and/or Table 2 is a joint transmission configuration indicator. Then, the first information indication field $C_{N.1}$ of the $N^{th}$ codepoint indicates that the corresponding first transmission configuration indication field $TCI_{N.1}$ is in the displayed state, so in this case, the first transmission configuration indication field $TCI_{N.1}$ gives a TCI state, further, the terminal acquires the TCI state in the $TCI_{N.1}$ for the communication transmission.

In some embodiments, the first indication information and/or the second indication information indicate that the $N^{th}$ codepoint corresponds to a joint transmission configuration indicator (joint TCI), and the corresponding second information indication field is used to indicate that the second transmission configuration indication field is in the non-displayed state. For example, the second information indication field $C_{N.2}$ of the $N^{th}$ codepoint in Table 1 and/or Table 2 indicates that the corresponding second transmission configuration indication field $TCI_{N.2}$ is in the non-displayed state. In this case, the terminal cannot acquire the TCI state from the second transmission configuration indication field for the communication transmission.

In step A2, it is determined according to the first indication information and/or the second indication information that the first codepoint corresponds to the joint transmission configuration indicator, the first information indication field corresponding to the first transmission configuration indication field included in the first codepoint indicates that the first transmission configuration indication field is in a non-displayed state, the second information indication field corresponding to the second transmission configuration indication field included in the first codepoint indicates that the second transmission configuration indication field is in a displayed state, and the transmission configuration indicator state is acquired according to a second transmission configuration indicator state displayed in the second transmission configuration indication field.

In embodiments of the present disclosure, the first indication information and/or the second indication information indicate that the first codepoint corresponds to the joint transmission configuration indicator (joint TCI), and the first information indication field is used to indicate the corresponding first transmission configuration indication field is in the non-displayed state.

In some embodiments, the first information indication field $C_{N.1}$ of the $N^{th}$ codepoint in Table 1 and/or Table 2 indicates that the corresponding first transmission configuration indication field $TCI_{N.1}$ is in the non-display state.

The first indication information and/or the second indication information indicate that the first codepoint corresponds to the joint transmission configuration indicator (joint TCI), and the second information indication field is used to indicate that the corresponding second transmission configuration indication field is in the displayed state. Further, the corresponding transmission configuration indicator state (TCI state) is acquired according to the second transmission configuration indicator state displayed in the second transmission configuration indication field.

In some embodiments, the second information indication field $C_{N.2}$ of the $N^{th}$ codepoint in Table 1 and/or Table 2 indicates that the corresponding second transmission configuration indication field $TCI_{N.2}$ is in the displayed state. Further, the TCI state in the $TCI_{N.2}$ is acquired for the communication transmission.

At least one of the following items of the configuration information in embodiments of the present disclosure is specific to one TRP: the first indication information, the second indication information, or the first transmission configuration indication field, the second transmission configuration indication field, the first information indication field and the second information indication field corresponding to each TCI codepoint.

If there are multiple TRPs, the configuration information includes at least one of the following items for each TRP: the first indication information, the second indication information, or the first transmission configuration indication field, the second transmission configuration indication field, the first information indication field and the second information indication field corresponding to each TCI codepoint.

It should be noted that when implementing the method for configuring the transmission configuration indicator (TCI) state provided in the present disclosure, an implementer can choose one of the steps A1 and A2 to implement according to actual situations.

By implementing embodiments of the present disclosure, it is possible to acquire whether the first codepoint corresponds to the joint transmission configuration indicator or the separate transmission configuration indicator according to the first indication information and/or the second indication information, and further acquire the transmission configuration indicator state corresponding to the first codepoint according to the first information indication field and/or the second information indication field, and the first transmission configuration indication field and/or the second transmission configuration indication field corresponding to the first codepoint, which saves signaling resources, and is beneficial to avoiding waste of resources.

In some embodiments, the first transmission configuration indicator state or the second transmission configuration indicator state is a transmission configuration indicator state in a joint transmission configuration indicator state pool, and the transmission configuration indicator state in the joint transmission configuration indicator state pool is applicable to an uplink communication transmission and a downlink communication transmission.

In embodiments of the present disclosure, the joint transmission configuration indicator state pool is preset, and the transmission configuration indicator state in the joint transmission configuration indicator state pool is applicable to the uplink communication transmission and the downlink communication transmission. A transmission configuration indicator state corresponding to the first transmission configuration indicator state or the second transmission configuration indicator state exists in the joint transmission configuration indicator state pool.

Acquiring the transmission configuration indicator state according to the first indication information and/or the second indication information includes: acquiring the transmission configuration indicator state according to the first indication information and/or the second indication information, and at least one of the first transmission configuration indication field, the second transmission configuration indication field, the first information indication field or the second information indication field corresponding to the first codepoint, which includes at any of following steps.

In step B1, it is determined according to the first indication information and/or the second indication information that the first codepoint corresponds to the separate transmission configuration indicator, the first information indication field corresponding to the first transmission configuration indication field included in the first codepoint indicates that the first transmission configuration indication field is in a displayed state, the second information indication field corresponding to the second transmission configuration indication field included in the first codepoint indicates that the second transmission configuration indication field is in a non-displayed state, and the transmission configuration indicator state is acquired according to a first transmission configuration indicator state displayed in the first transmission configuration indication field.

In embodiments of the present disclosure, if the first indication information and/or the second indication information indicate that the first codepoint corresponds to the separate transmission configuration indicator (separate TCI), the first information indication field corresponding to the first codepoint is used to indicate that the corresponding first transmission configuration indication field is in the displayed state, and the second information indication field corresponding to the first codepoint is used to indicate that the corresponding second transmission configuration indication field is in the not-displayed state, the corresponding first transmission configuration indicator state is acquired according to the first transmission configuration indication field in the displayed state, and the transmission configuration indicator state is acquired according to the first transmission configuration indicator state.

In some embodiments, if the first indication information and/or the second indication information indicate that the $N^{th}$ codepoint in Table 1 and/or Table 2 corresponds to the separate TCI, the first transmission configuration indication field $TCI_{N.1}$ corresponding to the first information indication field $C_{N.1}$ corresponding to the $N^{th}$ codepoint in Table 1 and/or Table 2 is in the displayed state, and the second transmission configuration indication field $TCI_{N.2}$ corresponding to the second information indication field $C_{N.2}$ is in the non-displayed state, the first transmission configuration indicator state (TCI state) in the $TCI_{N.1}$ in the displayed state is acquired, and further the corresponding transmission configuration indicator state is acquired according to the first TCI state for the communication transmission.

In step B2, it is determined according to the first indication information and/or the second indication information that the first codepoint corresponds to the separate transmission configuration indicator, the first information indication field corresponding to the first transmission configuration indication field included in the first codepoint indicates that the first transmission configuration indication field is in a non-displayed state, the second information indication field corresponding to the second transmission configuration indication field included in the first codepoint indicates that the second transmission configuration indication field is in a displayed state, and the transmission configuration indicator state is acquired according to a second transmission configuration indicator state displayed in the second transmission configuration indication field.

In embodiments of the present disclosure, if the first indication information and/or the second indication information indicate that the first codepoint corresponds to the separate transmission configuration indicator (separate TCI), the first information indication field corresponding to the first codepoint is used to indicate that the corresponding first transmission configuration indication field is in the not-displayed state, and the second information indication field corresponding to the first codepoint is used to indicate that the corresponding second transmission configuration indication field is in the displayed state, the corresponding second transmission configuration indicator state is acquired according to the second transmission configuration indication field in the displayed state, and further the transmission configuration indicator state is acquired according to the second transmission configuration indicator state.

In some embodiments, if the first indication information and/or the second indication information indicate that the $N^{th}$ codepoint in Table 1 and/or Table 2 corresponds to the separate TCI, the first transmission configuration indication field $TCI_{N,1}$ corresponding to the first information indication field $C_{N,1}$ corresponding to the $N^{th}$ codepoint in Table 1 and/or Table 2 is in the non-displayed state, and the second transmission configuration indication field $TCI_{N,2}$ corresponding to the second information indication field $C_{N,2}$ is in the displayed state, the second transmission configuration indicator state (TCI state) in the $TCI_{N,2}$ in the displayed state is acquired, and further the corresponding transmission configuration indicator state is acquired according to the second TCI state for the communication transmission.

In step B3, it is determined according to the first indication information and/or the second indication information that the first codepoint corresponds to the separate transmission configuration indicator, the first information indication field corresponding to the first transmission configuration indication field included in the first codepoint indicates that the first transmission configuration indication field is in a displayed state, the second information indication field corresponding to the second transmission configuration indication field included in the first codepoint indicates that the second transmission configuration indication field is in a displayed state, and the transmission configuration indicator state is acquired according to a first transmission configuration indicator state displayed in the first transmission configuration indication field and a second transmission configuration indicator state displayed in the second transmission configuration indication field.

In embodiments of the present disclosure, if the first indication information and/or the second indication information indicate that the first codepoint corresponds to the separate transmission configuration indicator (separate TCI), the first information indication field corresponding to the first codepoint is used to indicate that the corresponding first transmission configuration indication field is in the displayed state, and the second information indication field corresponding to the first codepoint is used to indicate that the corresponding second transmission configuration indication field is in the displayed state, the corresponding first transmission configuration indicator state is acquired according to the first transmission configuration indication field in the displayed state, and at the same time, the corresponding second transmission configuration indicator state is acquired according to the second transmission configuration indication field, and further the transmission configuration indicator state is acquired according to the first transmission configuration indicator state and the second transmission configuration indicator state.

In some embodiments, if the first indication information and/or the second indication information indicate that the $N^{th}$ codepoint in Table 1 and/or Table 2 corresponds to the separate TCI, the first transmission configuration indication field $TCI_{N,1}$ corresponding to the first information indication field $C_{N,1}$ corresponding to the $N^{th}$ codepoint in Table 1 and/or Table 2 is in the displayed state, and the second transmission configuration indication field $TCI_{N,2}$ corresponding to the second information indication field $C_{N,2}$ is in the displayed state, the first transmission configuration indicator state (TCI state) in the $TCI_{N,1}$ in the displayed state is acquired, and at the same time, the second transmission configuration indicator state (TCI state) in the $TCI_{N,2}$ in the displayed state is acquired, and further the corresponding transmission configuration indicator state is acquired according to the first TCI state and the second TCI state for the communication transmission.

It should be noted that when implementing the method for configuring the transmission configuration indicator (TCI) state provided in the present disclosure, an implementer can choose one of the steps B1, B2 and B3 to implement according to actual situations.

At least one of the following items of the configuration information in embodiments of the present disclosure is specific to one TRP: the first indication information, the second indication information, or the first transmission configuration indication field, the second transmission configuration indication field, the first information indication field and the second information indication field corresponding to each TCI codepoint.

If there are multiple TRPs, the configuration information includes at least one of the following items for each TRP: the first indication information, the second indication information, or the first transmission configuration indication field, the second transmission configuration indication field, the first information indication field and the second information indication field corresponding to each TCI codepoint.

By implementing embodiments of the present disclosure, when the first indication information and/or the second indication information indicate that the first codepoint corresponds to the separate transmission configuration indicator (separate TCI), it is possible to acquire whether the first codepoint is a joint transmission configuration or a separate transmission configuration according to the first indication information and/or the second indication information, and further acquire the transmission configuration indicator state corresponding to the first codepoint according to the first transmission configuration indicator state and/or the second transmission configuration indicator state in the first transmission configuration indication field and/or the second transmission configuration indication field corresponding to the first information indication field and/or the second information indication field, which saves signaling resources, and is beneficial to avoiding waste of resources.

In some embodiments, the first transmission configuration indicator state is a transmission configuration indicator state in a separate downlink transmission configuration indicator state pool, and the second transmission configuration indicator state is a transmission configuration indicator state in a separate uplink transmission configuration indicator state pool. The transmission configuration indicator state in the separate downlink transmission configuration indicator state is applicable to a downlink communication transmission, and the transmission configuration indicator state in the separate uplink transmission configuration indicator state pool is applicable to an uplink communication transmission.

Alternatively, the first transmission configuration indicator state is a transmission configuration indicator state in a separate uplink transmission configuration indicator state pool, and the second transmission configuration indicator state is a transmission configuration indicator state in a separate downlink transmission configuration indicator state pool.

In embodiments of the present disclosure, the separate downlink transmission configuration indicator state pool and the separate uplink transmission configuration indicator state pool are set. The separate downlink transmission configuration indicator state pool includes at least one separate downlink transmission configuration indicator state, and the separate uplink transmission configuration indicator state pool includes at least one separate uplink transmission configuration indicator state. A transmission configuration indicator state corresponding to the first transmission configuration indicator state exists in the separate downlink transmission configuration indicator state pool, and a transmission configuration indicator state corresponding to the second transmission configuration indicator state exists in the separate uplink transmission configuration indicator state pool.

In some embodiments, the communication transmission includes at least one of a downlink communication transmission or an uplink communication transmission.

The downlink communication transmission includes at least one of: a physical downlink control channel (PDCCH) transmission, a physical downlink shared channel (PDSCH) transmission, a physical broadcast channel (PBCH) transmission, a synchronization signal block (SSB) transmission, a channel state information reference signal (CSI-RS) transmission, a demodulation reference signal (DMRS) transmission, or a positioning reference signal (PRS) transmission.

The demodulation reference signal (DMRS) is used to evaluate a wireless channel to facilitate signal demodulation. The DMRS is a user terminal-specific reference signal, which can be beam-formed or incorporated into scheduled resources.

The CSI-RS may be used for beam management, channel quality indication (CQI) feedback and tracking of a reference signal (RS). The beam management includes, but is not limited to, beam scanning, beam measurement, beam selection, beam reporting, and beam failure recovery. The CQI feedback is a downlink channel state reported by the terminal device to the network device according to a reference signal received quality (RSRQ) of the CSI-RS sent by the network device.

The uplink communication transmission includes at least one of: a physical uplink control channel (PUCCH) transmission, a physical uplink shared channel (PUSCH) transmission, a physical random access channel (PRACH) transmission, a sounding reference signal (SRS) transmission, or a demodulation reference signal (DMRS) transmission.

The SRS may be used for beam management and/or positioning and/or codebook-based channel measurement or non-codebook-based channel measurement. The network-side device may perform the codebook-based channel measurement or the non-codebook-based channel measurement according to the SRS, so as to provide reference information for scheduling of the network-side device.

In some embodiments, the separate downlink transmission configuration indicator state pool, the separate uplink transmission configuration indicator state pool, and the joint transmission configuration indicator state pool are different from one another, or at least two of the separate downlink transmission configuration indicator state pool, the separate uplink transmission configuration indicator state pool, and the joint transmission configuration indicator state pool are the same.

The separate downlink transmission configuration indicator state pool may be the same as or different from the joint transmission configuration indicator state pool.

The separate uplink transmission configuration indicator state pool may be the same as or different from the joint transmission configuration indicator state pool.

The separate uplink transmission configuration indicator state pool may be the same as or different from the separate downlink transmission configuration indicator state pool.

In some embodiments, the configuration information includes a media access control (MAC) control element (CE).

In embodiments of the present disclosure, the MAC CE may be configured with multiple transmission configuration indicator states corresponding to multiple codepoints.

By implementing embodiments of the present disclosure, the transmission configuration indicator state corresponding to each element in the codepoints may be indicated according to the transmission configuration configured in the MAC CE, which saves signaling resources, and is beneficial to avoiding waste of resources.

In some embodiments, acquiring the transmission configuration indicator state corresponding the communication transmission according to the transmission configuration indicator codepoint includes: receiving downlink control information (DCI) from the network device, and determining the transmission configuration indicator codepoint according to the DCI.

In embodiments of the present disclosure, the DCI indicates one of the codepoints. Further, the terminal acquires the transmission configuration indicator corresponding to the codepoint for the communication transmission according to the configuration information.

By implementing embodiments of the present disclosure, the codepoint may be indicated according to the DCI, and the transmission configuration indicator state corresponding to the codepoint may be obtained according to the configuration information, which saves signaling resources, and is beneficial to avoiding waste of resources.

Embodiments of the present disclosure provide another method for configuring a transmission configuration indicator (TCI) state, which is performed by a network device, and the method includes: sending configuration information to a terminal device. The configuration information includes at least one transmission configuration indicator state corresponding to at least one transmission configuration indicator codepoint.

In embodiments of the present disclosure, the configuration information may include an MAC CE, and the MAC CE includes a transmission configuration indicator state corresponding to each element in the transmission configuration indicator codepoints. It is also possible to send DCI, the DCI includes the configuration information, and the DCI indicates one of the codepoints. Further, the terminal acquires the transmission configuration indicator corresponding to the codepoint according to the configuration information, and uses it for a communication transmission.

By implementing embodiments of the present disclosure, the transmission configuration indicator state corresponding to the codepoint may be indicated according to the transmission configuration, which saves signaling resources, and is beneficial to avoiding waste of resources.

The configuration information is sent to the terminal device, and the configuration information includes at least one transmission configuration indicator state corresponding to at least one transmission configuration indicator codepoint. The configuration information further includes: first indication information.

The first indication information is configured to indicate that all elements in the at least one transmission configuration indicator codepoint correspond to joint transmission configuration indicators, or the first indication information is configured to indicate that all elements in the at least one transmission configuration indicator codepoint correspond to separate transmission configuration indicators. The separate transmission configuration indicator includes at least one of a separate uplink transmission configuration indicator or a separate downlink transmission configuration indicator.

In embodiments of the present disclosure, the codepoints are as shown in Table 1, where R represents a reserved bit. The first indication information may reuse the reserved bit R, or a new bit is introduced for the first indication information. If the terminal device receives the first indication information, all elements in the codepoints correspond to joint transmission configuration indicators, or all elements in the codepoints correspond to separate transmission configuration indicators. For example, if the bit of the first indication information is displayed as "0", it means that TCIs corresponding to all TCI codepoints activated in an MAC CE are joint TCIs: if the bit of the first indication information is displayed as "1", it means that the TCIs corresponding to all TCI codepoints activated in the MAC CE are separate TCIs. Alternatively, for example, if the bit of the first indication information is displayed as "1", it means that TCIs corresponding to all TCI codepoints activated in the MAC CE are joint TCIs: if the bit of the first indication information is displayed as "0". it means that the TCIs corresponding to all TCI codepoints activated in the MAC CE are separate TCIs. The separate transmission configuration indicator includes at least one of the separate uplink transmission configuration indicator or the separate downlink transmission configuration indicator.

The configuration information is sent to the terminal device, and the configuration information includes at least one transmission configuration indicator state corresponding to at least one transmission configuration indicator codepoint. The configuration information further includes: second indication information.

The second indication information is configured to indicate that each element in the at least one transmission configuration indicator codepoint corresponds to a joint transmission configuration indicator or a separate transmission configuration indicator. The separate transmission configuration indicator includes at least one of a separate uplink transmission configuration indicator or a separate downlink transmission configuration indicator.

In embodiments of the present disclosure, the codepoints are as shown in Table 2, where R represents a reserved bit. The configuration information includes N+1 TCI codepoints, that is, $TCI_{i,1}$ and $TCI_{i,2}$ correspond to a TCI codepoint i. Therefore, the second indication information includes N+1 indication fields, i.e., $C_0$, $C_1$, ..., $C_{N-1}$, $C_N$. An $i^{th}$ indication field is configured to indicate that an $i^{th}$ transmission configuration indicator codepoint corresponds to a joint transmission configuration indicator or a separate transmission configuration indicator. For example, if $C_i$ is displayed as "0", it means that a TCI corresponding to a TCI codepoint i is a joint TCI, if $C_i$ is displayed as "1", it means that the TCI corresponding to the TCI codepoint i is a separate TCI. Alternatively, for example, if $C_i$ is displayed as "1", it means that the TCI corresponding to the TCI codepoint i is a joint TCI, if $C_i$ is displayed as "0", it means that the TCI corresponding to the TCI codepoint i is a separate TCI. If the terminal device receives the second indication information, the terminal determines that each element in the TCI codepoints, i.e., each TCI codepoint, corresponds to a separate transmission configuration indicator or a joint transmission configuration indicator. The separate transmission configuration indicator includes at least one of a separate uplink transmission configuration indicator or a separate downlink transmission configuration indicator.

Figure 3:
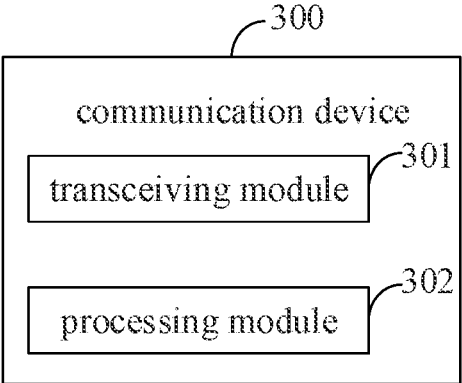
FIG. 3 is a schematic block diagram of a communication device according to embodiments of the present disclosure.

Referring to FIG. 3, FIG. 3 is a schematic block diagram of a communication device according to embodiments of the present disclosure. The communication device 300 shown in FIG. 3 may include a transceiving module 301 and a processing module 302. The transceiving module 301 may include a sending module and/or a receiving module, the sending module is configured to implement a sending function, the receiving module is configured to implement a receiving function, and the transceiving module 301 may implement the sending function and/or the receiving function.

The communication device 300 may be a terminal device, an apparatus in the terminal device, or an apparatus that can be matched with the terminal device. Alternatively, the communication device 300 may be a network device, an apparatus in the network device, or an apparatus that can be matched with the network device.

When the communication device 300 is a terminal device (such as the terminal device as described in the above method embodiments), the communication device 300 includes a receiving module and an indicator state acquiring module.

The receiving module is configured to receive configuration information sent by a network device. The configuration information includes at least one transmission configuration indicator state corresponding to at least one transmission configuration indicator codepoint.

In embodiments of the present disclosure, the terminal device may receive the configuration information sent by the network device, and the network device may send the configuration information to the terminal device. The configuration information is configured to indicate a transmission configuration indicator corresponding to an element in the at least one transmission configuration indicator codepoint, and the transmission configuration indicator includes at least one of a joint transmission configuration indicator or a separate transmission configuration indicator. The separate transmission configuration indicator includes at least one of a separate uplink transmission configuration indicator or a separate downlink transmission configuration indicator.

The indicator state acquiring module is configured to acquire a transmission configuration indicator state corresponding to a communication transmission according to the transmission configuration indicator codepoint.

In embodiments of the present disclosure, the terminal is pre-configured with a transmission configuration indicator (TCI) state pool, and by taking advantage of the transmission configuration indicator codepoint, the terminal may acquire the transmission configuration indicator state (TCI state) corresponding to the communication transmission according to the codepoint. The TCI state is a TCI state in the TCI state pool.

By implementing embodiments of the present disclosure, the transmission configuration indicator state corresponding to the communication transmission may be acquired according to the configuration information sent by the network device, and multiple transmission configuration indicator states corresponding to multiple transmission configuration indicator codepoints may be acquired according to one configuration information. In this way, signaling resources are saved, thereby avoiding waste of resources.

The configuration information further includes first indication information.

The first indication information is configured to indicate that all elements in the at least one transmission configuration indicator codepoint correspond to joint transmission configuration indicators. Alternatively, the first indication information is configured to indicate that all elements in the at least one transmission configuration indicator codepoint correspond to separate transmission configuration indicators. The separate transmission configuration indicator includes at least one of a separate uplink transmission configuration indicator or a separate downlink transmission configuration indicator.

In embodiments of the present disclosure, the codepoints are as shown in Table 1, where R represents a reserved bit. The first indication information may reuse the reserved bit R, or a new bit is introduced for the first indication information. If the terminal device receives the first indication information, all elements in the codepoints correspond to joint transmission configuration indicators, or all elements in the codepoints correspond to separate transmission configuration indicators. For example, if the bit of the first indication information is displayed as "0", it means that TCIs corresponding to all TCI codepoints activated in an MAC CE are joint TCIs: if the bit of the first indication information is displayed as "1", it means that the TCIs corresponding to all TCI codepoints activated in the MAC CE are separate TCIs. Alternatively, for example, if the bit of the first indication information is displayed as "1", it means that TCIs corresponding to all TCI codepoints activated in the MAC CE are joint TCIs: if the bit of the first indication information is displayed as "0". it means that the TCIs corresponding to all TCI codepoints activated in the MAC CE are separate TCIs. The separate transmission configuration indicator includes at least one of the separate uplink transmission configuration indicator or the separate downlink transmission configuration indicator.

$C_{N.1}$ represents a first information indication field, and $C_{N.2}$ represents a second information indication field. The $C_{N.1}$ corresponds to a first transmission configuration indication field $TCI_{N.1}$ corresponding to an $N^{th}$ TCI codepoint, and the $C_{N.2}$ corresponds to a second transmission configuration indication field $TCI_{N.2}$ corresponding to the $N^{th}$ TCI codepoint. By implementing embodiments of the present disclosure, it is possible to use one MAC CE configuration information to indicate that the transmission configuration indicators corresponding to all elements in the TCI codepoints, i.e., all TCI codepoints, are joint TCIs or independent TCIs, which saves signaling resources, and is beneficial to avoiding waste of resources.

In a possible implementation, the configuration information further includes second indication information.

The second indication information is configured to indicate that each element in the at least one transmission configuration indicator codepoint corresponds to a joint transmission configuration indicator or a separate transmission configuration indicator. The separate transmission configuration indicator includes at least one of a separate uplink transmission configuration indicator or a separate downlink transmission configuration indicator.

In embodiments of the present disclosure, the codepoints are as shown in Table 2, where R represents a reserved bit. The configuration information includes N+1 TCI codepoints, that is, $TCI_{i.1}$ and $TCI_{i.2}$ correspond to a TCI codepoint i. For example, $TCI_{0.1}$ and $TCI_{0.2}$ correspond to a TCI codepoint 0. Therefore, the second indication information includes N+1 indication fields, i.e., $C_0$, $C_1$, . . . , $C_{N-1}$, $C_N$. An $i^{th}$ indication field is configured to indicate that an $i^{th}$ transmission configuration indicator codepoint corresponds to a joint transmission configuration indicator or a separate transmission configuration indicator. For example, if $C_i$ is displayed as "0", it means that a TCI corresponding to a TCI codepoint i is a joint TCI, if $C_i$ is displayed as "1", it means that the TCI corresponding to the TCI codepoint i is a separate TCI. Alternatively, for example, if $C_i$ is displayed as "1", it means that the TCI corresponding to the TCI codepoint i is a joint TCI, if $C_i$ is displayed as "0", it means that the TCI corresponding to the TCI codepoint i is a separate TCI. If the terminal device receives the second indication information, the terminal determines that each element in the TCI codepoints, i.e., each TCI codepoint, corresponds to a separate transmission configuration indicator or a joint transmission configuration indicator. The separate transmission configuration indicator includes at least one of a separate uplink transmission configuration indicator or a separate downlink transmission configuration indicator.

$C_{N.1}$ represents a first information indication field, and $C_{N.2}$ represents a second information indication field. The $C_{N.1}$ corresponds to a first transmission configuration indication field $TCI_{N.1}$ corresponding to an $N^{th}$ TCI codepoint, and the $C_{N.2}$ corresponds to a second transmission configuration indication field $TCI_{N.2}$ corresponding to the $N^{th}$ TCI codepoint. The N is an integer greater than or equal to 0. By implementing embodiments of the present disclosure, it is possible to use a plurality of indication fields contained in one indication information to respectively indicate the transmission configuration indicator corresponding to each element in the TCI codepoints, which improves flexibility.

In a possible implementation, the second indication information includes N indication fields, where the $i^{th}$ indication field is configured to indicate that the $i^{th}$ transmission configuration indicator codepoint corresponds to a joint transmission configuration indicator or a separate transmission configuration indicator, and the N represents a number of activated transmission configuration indicator codepoints included in the configuration information. The indication field may be used to indicate that the TCI corresponding to an element in the codepoints is a separate transmission configuration indicator (separate TCI) and/or a joint transmission configuration indicator (joint TCI).

In embodiments of the present disclosure, the transmission configuration indicator type corresponding to the respective TCI codepoint is determined according to the indication field, so as to further determine the stransmission configuration indicator state.

In a possible implementation, the indicator state acquiring module includes a first indicator state acquiring submodule.

The first indicator state acquiring submodule is configured to acquire the transmission configuration indicator state according to the first indication information and/or the second indication information.

In a possible implementation, the indicator state acquiring module includes a second indicator state acquiring submodule.

The second indicator state acquiring submodule is configured to acquire the transmission configuration indicator state according to the first indication information and/or the second indication information, and at least one of a first transmission configuration indication field, a second transmission configuration indication field, a first information indication field or a second information indication field corresponding to a first codepoint.

In embodiments of the present disclosure, whether the transmission configuration indicator in the corresponding first codepoint is a joint transmission configuration indicator or a separate transmission configuration indicator may be acquired according to the first indication information and/or the second indication information, and the transmission configuration indicator state (TCI state) may be acquired according to the first information indication field, and/or the second information indication field, and/or the first transmission configuration indication field, and/or the second transmission configuration indication field.

By implementing embodiments of the present disclosure, it is possible to acquire whether the transmission configuration indicator in the corresponding first codepoint is a joint transmission configuration indicator or a separate transmission configuration indicator according to the first indication information and/or the second indication information, and to further acquire the transmission configuration indicator state (TCI state) according to the first information indication field, and/or the second information indication field, and/or the first transmission configuration indication field, and/or the second transmission configuration indication field, which saves signaling resources, and is beneficial to avoiding waste of resources.

In a possible implementation, the second indicator state acquiring submodule includes a first indicator state acquiring unit or a second indicator state acquiring unit.

The first indicator state acquiring unit is configured to: determine that the first codepoint corresponds to the joint transmission configuration indicator according to the first indication information and/or the second indication information, determine that the first information indication field corresponding to the first transmission configuration indication field included in the first codepoint indicates that the first transmission configuration indication field is in a displayed state, determine that the second information indication field corresponding to the second transmission configuration indication field included in the first codepoint indicates that the second transmission configuration indication field is in a non-displayed state, and acquire the transmission configuration indicator state according to a first transmission configuration indicator state displayed in the first transmission configuration indication field.

In embodiments of the present disclosure, the first indication information and/or the second indication information indicate that the first codepoint corresponds to the joint transmission configuration indicator (joint TCI). Further, according to the first information indication field, and/or the second information indication field, and/or the first transmission configuration indication field, and/or the second transmission configuration indication field corresponding to the first codepoint, the transmission configuration indicator state (TCI state) may be acquired. The first information indication field is configured to indicate that the corresponding first transmission configuration indication field is in a displayed state. The corresponding transmission configuration indicator state (TCI state) is acquired according to the first transmission configuration indicator state displayed in the first transmission configuration indication field.

In some embodiments, the $N^{th}$ codepoint in Table 1 and/or Table 2 is a joint transmission configuration indicator. Then, the first information indication field $C_{N.1}$ of the $N^{th}$ codepoint indicates that the corresponding first transmission configuration indication field $TCI_{N.1}$ is in the displayed state, so in this case, the first transmission configuration indication field $TCI_{N.1}$ gives a TCI state, further, the terminal acquires the TCI state in the $TCI_{N.1}$ for the communication transmission.

In some embodiments, the first indication information and/or the second indication information indicate that the $N^{th}$ codepoint corresponds to a joint transmission configuration indicator (joint TCI), and the corresponding second information indication field is used to indicate that the second transmission configuration indication field is in the non-displayed state. For example, the second information indication field $C_{N.2}$ of the $N^{th}$ codepoint in Table 1 and/or Table 2 indicates that the corresponding second transmission configuration indication field $TCI_{N.2}$ is in the non-displayed state. In this case, the terminal cannot acquire the TCI state from the second transmission configuration indication field for the communication transmission.

The second indicator state acquiring unit is configured to: determine that the first codepoint corresponds to the joint transmission configuration indicator according to the first indication information and/or the second indication information, determine that the first information indication field corresponding to the first transmission configuration indication field included in the first codepoint indicates that the first transmission configuration indication field is in a non-displayed state, determine that the second information indication field corresponding to the second transmission configuration indication field included in the first codepoint indicates that the second transmission configuration indication field is in a displayed state, and acquire the transmission configuration indicator state according to a second transmission configuration indicator state displayed in the second transmission configuration indication field In embodiments of the present disclosure, the first indication information and/or the second indication information indicate that the first codepoint corresponds to the joint transmission configuration indicator (joint TCI), and the first information indication field is used to indicate the corresponding first transmission configuration indication field is in the non-displayed state.

In some embodiments, the first information indication field $C_{N.1}$ of the $N^{th}$ codepoint in Table 1 and/or Table 2 indicates that the corresponding first transmission configuration indication field $TCI_{N.1}$ is in the non-display state.

The first indication information and/or the second indication information indicate that the first codepoint corresponds to the joint transmission configuration indicator (joint TCI), and the second information indication field is used to indicate that the corresponding second transmission configuration indication field is in the displayed state. Further, the corresponding transmission configuration indicator state (TCI state) is acquired according to the second transmission configuration indicator state displayed in the second transmission configuration indication field.

In some embodiments, the second information indication field $C_{N.2}$ of the $N^{th}$ codepoint in Table 1 and/or Table 2 indicates that the corresponding second transmission configuration indication field $TCI_{N.2}$ is in the displayed state. Further, the TCI state in the $TCI_{N.2}$ is acquired for the communication transmission.

By implementing embodiments of the present disclosure, it is possible to acquire whether the first codepoint corresponds to the joint transmission configuration indicator or the separate transmission configuration indicator according to the first indication information and/or the second indication information, and further acquire the transmission configuration indicator state corresponding to the first codepoint according to the first information indication field and/or the second information indication field, and the first transmission configuration indication field and/or the second transmission configuration indication field corresponding to the first codepoint, which saves signaling resources, and is beneficial to avoiding waste of resources.

In a possible implementation, the first transmission configuration indicator state or the second transmission configuration indicator state is a transmission configuration indicator state in a joint transmission configuration indicator state pool, and the transmission configuration indicator state in the joint transmission configuration indicator state pool is applicable to an uplink communication transmission and a downlink communication transmission.

In embodiments of the present disclosure, the joint transmission configuration indicator state pool is preset, and the transmission configuration indicator state in the joint transmission configuration indicator state pool is applicable to the uplink communication transmission and the downlink communication transmission. A transmission configuration indicator state corresponding to the first transmission configuration indicator state or the second transmission configuration indicator state exists in the joint transmission configuration indicator state pool.

In a possible implementation, the second indicator state acquiring submodule includes a third indicator state acquiring unit, a fourth indicator state acquiring unit, or a fifth indicator state acquiring unit.

The third indicator state acquiring unit is configured to: determine that the first codepoint corresponds to the separate transmission configuration indicator according to the first indication information and/or the second indication information, determine that the first information indication field corresponding to the first transmission configuration indication field included in the first codepoint indicates that the first transmission configuration indication field is in a displayed state, determine that the second information indication field corresponding to the second transmission configuration indication field included in the first codepoint indicates that the second transmission configuration indication field is in a non-displayed state, and acquire the transmission configuration indicator state according to a first transmission configuration indicator state displayed in the first transmission configuration indication field.

In embodiments of the present disclosure, if the first indication information and/or the second indication information indicate that the first codepoint corresponds to the separate transmission configuration indicator (separate TCI), the first information indication field corresponding to the first codepoint is used to indicate that the corresponding first transmission configuration indication field is in the displayed state, and the second information indication field corresponding to the first codepoint is used to indicate that the corresponding second transmission configuration indication field is in the not-displayed state, the corresponding first transmission configuration indicator state is acquired according to the first transmission configuration indication field in the displayed state, and the transmission configuration indicator state is acquired according to the first transmission configuration indicator state.

In some embodiments, if the first indication information and/or the second indication information indicate that the $N^{th}$ codepoint in Table 1 and/or Table 2 corresponds to the separate TCI, the first transmission configuration indication field $TCI_{N.1}$ corresponding to the first information indication field $C_{N.1}$ corresponding to the $N^{th}$ codepoint in Table 1 and/or Table 2 is in the displayed state, and the second transmission configuration indication field $TCI_{N.2}$ corresponding to the second information indication field $C_{N.2}$ is in the non-displayed state, the first transmission configuration indicator state (TCI state) in the $TCI_{N.1}$ in the displayed state is acquired, and further the corresponding transmission configuration indicator state is acquired according to the first TCI state for the communication transmission.

The fourth indicator state acquiring unit is configured to: determine that the first codepoint corresponds to the separate transmission configuration indicator according to the first indication information and/or the second indication information, determine that the first information indication field corresponding to the first transmission configuration indication field included in the first codepoint indicates that the first transmission configuration indication field is in a non-displayed state, determine that the second information indication field corresponding to the second transmission configuration indication field included in the first codepoint indicates that the second transmission configuration indication field is in a displayed state, and acquire the transmission configuration indicator state according to a second transmission configuration indicator state displayed in the second transmission configuration indication field In embodiments of the present disclosure, if the first indication information and/or the second indication information indicate that the first codepoint corresponds to the separate transmission configuration indicator (separate TCI), the first information indication field corresponding to the first codepoint is used to indicate that the corresponding first transmission configuration indication field is in the not-displayed state, and the second information indication field corresponding to the first codepoint is used to indicate that the corresponding second transmission configuration indication field is in the displayed state, the corresponding second transmission configuration indicator state is acquired according to the second transmission configuration indication field in the displayed state, and further the transmission configuration indicator state is acquired according to the second transmission configuration indicator state.

In some embodiments, if the first indication information and/or the second indication information indicate that the $N^{th}$ codepoint in Table 1 and/or Table 2 corresponds to the separate TCI, the first transmission configuration indication field $TCI_{N.1}$ corresponding to the first information indication field $C_{N.1}$ corresponding to the $N^{th}$ codepoint in Table 1 and/or Table 2 is in the non-displayed state, and the second transmission configuration indication field $TCI_{N.2}$ corresponding to the second information indication field $C_{N.2}$ is in the displayed state, the second transmission configuration indicator state (TCI state) in the $TCI_{N.2}$ in the displayed state is acquired, and further the corresponding transmission configuration indicator state is acquired according to the second TCI state for the communication transmission.

The fifth indicator state acquiring unit is configured to: determine that the first codepoint corresponds to the separate transmission configuration indicator according to the first indication information and/or the second indication information, determine that the first information indication field corresponding to the first transmission configuration indication field included in the first codepoint indicates that the first transmission configuration indication field is in a displayed state, determine that the second information indication field corresponding to the second transmission configuration indication field included in the first codepoint indicates that the second transmission configuration indication field is in a displayed state, and acquire the transmission configuration indicator state according to a first transmission configuration indicator state displayed in the first transmission configuration indication field and a second transmission configuration indicator state displayed in the second transmission configuration indication field.

In embodiments of the present disclosure, if the first indication information and/or the second indication information indicate that the first codepoint corresponds to the separate transmission configuration indicator (separate TCI), the first information indication field corresponding to the first codepoint is used to indicate that the corresponding first transmission configuration indication field is in the displayed state, and the second information indication field corresponding to the first codepoint is used to indicate that the corresponding second transmission configuration indication field is in the displayed state, the corresponding first transmission configuration indicator state is acquired according to the first transmission configuration indication field in the displayed state, and at the same time, the corresponding second transmission configuration indicator state is acquired according to the second transmission configuration indication field, and further the transmission configuration indicator state is acquired according to the first transmission configuration indicator state and the second transmission configuration indicator state.

In some embodiments, if the first indication information and/or the second indication information indicate that the $N^{th}$ codepoint in Table 1 and/or Table 2 corresponds to the separate TCI, the first transmission configuration indication field $TCI_{N.1}$ corresponding to the first information indication field $C_{N.1}$ corresponding to the $N^{th}$ codepoint in Table 1 and/or Table 2 is in the displayed state, and the second transmission configuration indication field $TCI_{N.2}$ corresponding to the second information indication field $C_{N.2}$ is in the displayed state, the first transmission configuration indicator state (TCI state) in the $TCI_{N.1}$ in the displayed state is acquired, and at the same time, the second transmission configuration indicator state (TCI state) in the $TCI_{N.2}$ in the displayed state is acquired, and further the corresponding transmission configuration indicator state is acquired according to the first TCI state and the second TCI state for the communication transmission.

By implementing embodiments of the present disclosure, when the first indication information and/or the second indication information indicate that the first codepoint corresponds to the separate transmission configuration indicator (separate TCI), it is possible to acquire whether the first codepoint is a joint transmission configuration or a separate transmission configuration according to the first indication information and/or the second indication information, and further acquire the transmission configuration indicator state corresponding to the first codepoint according to the first transmission configuration indicator state and/or the second transmission configuration indicator state in the first transmission configuration indication field and/or the second transmission configuration indication field corresponding to the first information indication field and/or the second information indication field, which saves signaling resources, and is beneficial to avoiding waste of resources.

In a possible implementation, the first transmission configuration indicator state is a transmission configuration indicator state in a separate downlink transmission configuration indicator state pool, and the second transmission configuration indicator state is a transmission configuration indicator state in a separate uplink transmission configuration indicator state pool. The transmission configuration indicator state in the separate downlink transmission configuration indicator state is applicable to a downlink communication transmission, and the transmission configuration indicator state in the separate uplink transmission configuration indicator state pool is applicable to an uplink communication transmission.

Alternatively, the first transmission configuration indicator state is a transmission configuration indicator state in a separate uplink transmission configuration indicator state pool, and the second transmission configuration indicator state is a transmission configuration indicator state in a separate downlink transmission configuration indicator state pool.

In a possible implementation, the communication transmission includes at least one of a downlink communication transmission or an uplink communication transmission.

The downlink communication transmission includes at least one of: a physical downlink control channel (PDCCH) transmission, a physical downlink shared channel (PDSCH) transmission, a physical broadcast channel (PBCH) transmission, a synchronization signal block (SSB) transmission, a channel state information reference signal (CSI-RS) transmission, a demodulation reference signal (DMRS) transmission, or a positioning reference signal (PRS) transmission.

The demodulation reference signal (DMRS) is used to evaluate a wireless channel to facilitate signal demodulation. The DMRS is a user terminal-specific reference signal, which can be beam-formed or incorporated into scheduled resources.

The CSI-RS may be used for beam management, channel quality indication (CQI) feedback and tracking of a reference signal (RS). The beam management includes, but is not limited to, beam scanning, beam measurement, beam selection, beam reporting, and beam failure recovery. The CQI feedback is a downlink channel state reported by the terminal device to the network device according to a reference signal received quality (RSRQ) of the CSI-RS sent by the network device.

The uplink communication transmission includes at least one of: a physical uplink control channel (PUCCH) transmission, a physical uplink shared channel (PUSCH) transmission, a physical random access channel (PRACH) transmission, a sounding reference signal (SRS) transmission, or a demodulation reference signal (DMRS) transmission.

The SRS may be used for beam management and/or positioning and/or codebook-based channel measurement or non-codebook-based channel measurement. The network-side device may perform the codebook-based channel measurement or the non-codebook-based channel measurement according to the SRS, so as to provide reference information for scheduling of the network-side device.

In a possible implementation, the separate downlink transmission configuration indicator state pool, the separate uplink transmission configuration indicator state pool, and the joint transmission configuration indicator state pool are different from one another, or at least two of the separate downlink transmission configuration indicator state pool, the separate uplink transmission configuration indicator state pool, and the joint transmission configuration indicator state pool are the same.

In a possible implementation, the configuration information includes a media access control (MAC) control element (CE).

By implementing embodiments of the present disclosure, the transmission configuration indicator state corresponding to each element in the codepoints may be indicated according to the transmission configuration configured in the MAC CE, which saves signaling resources, and is beneficial to avoiding waste of resources.

In a possible implementation, the indicator state acquiring module includes a codepoint determining submodule.

The codepoint determining submodule is configured to: receive downlink control information (DCI) from the network device, and determine the transmission configuration indicator codepoint according to the DCI.

In embodiments of the present disclosure, the DCI indicates one of the codepoints. Further, the terminal acquires the transmission configuration indicator corresponding to the codepoint for the communication transmission according to the configuration information.

By implementing embodiments of the present disclosure, the codepoint may be indicated according to the DCI, and the transmission configuration indicator state corresponding to the codepoint may be obtained according to the configuration information, which saves signaling resources, and is beneficial to avoiding waste of resources.

When the communication device 400 is a network device, the communication device 400 includes a configuration information sending module.

The configuration information sending module is configured to send configuration information to a terminal device. The configuration information includes at least one transmission configuration indicator state corresponding to at least one transmission configuration indicator codepoint.

In embodiments of the present disclosure, the configuration information may include an MAC CE, and the transmission configuration indicator state corresponding to each element in the codepoints is indicated according to the transmission configuration configured in the MAC CE. It is also possible to send DCI, the DCI includes the configuration information, and the DCI indicates one of the codepoints. Further, the terminal acquires the transmission configuration indicator corresponding to the codepoint according to the configuration information, and uses it for a communication transmission.

By implementing embodiments of the present disclosure, the transmission configuration indicator state corresponding to the codepoint may be indicated according to the transmission configuration, which saves signaling resources, and is beneficial to avoiding waste of resources.

In a possible implementation, the configuration information further includes first indication information.

The first indication information is configured to indicate that all elements in the at least one transmission configuration indicator codepoint correspond to joint transmission configuration indicators, or the first indication information is configured to indicate that all elements in the at least one transmission configuration indicator codepoint correspond to separate transmission configuration indicators. The separate transmission configuration indicator includes at least one of a separate uplink transmission configuration indicator or a separate downlink transmission configuration indicator.

In embodiments of the present disclosure, the codepoints are as shown in Table 1, where R represents a reserved bit. The first indication information may reuse the reserved bit R, or a new bit is introduced for the first indication information. If the terminal device receives the first indication information, all elements in the codepoints correspond to joint transmission configuration indicators, or all elements in the codepoints correspond to separate transmission configuration indicators. For example, if the bit of the first indication information is displayed as "0", it means that TCIs corresponding to all TCI codepoints activated in an MAC CE are joint TCIs: if the bit of the first indication information is displayed as "1", it means that the TCIs corresponding to all TCI codepoints activated in the MAC CE are separate TCIs. Alternatively, for example, if the bit of the first indication information is displayed as "1", it means that TCIs corresponding to all TCI codepoints activated in the MAC CE are joint TCIs: if the bit of the first indication information is displayed as "0". it means that the TCIs corresponding to all TCI codepoints activated in the MAC CE are separate TCIs. The separate transmission configuration indicator includes at least one of the separate uplink transmission configuration indicator or the separate downlink transmission configuration indicator.

In a possible implementation, the configuration information further includes: second indication information.

The second indication information is configured to indicate that each element in the at least one transmission configuration indicator codepoint corresponds to a joint transmission configuration indicator or a separate transmission configuration indicator. The separate transmission configuration indicator includes at least one of a separate uplink transmission configuration indicator or a separate downlink transmission configuration indicator.

In embodiments of the present disclosure, the codepoints are as shown in Table 2, where R represents a reserved bit. The codepoints include N+1 codepoints, that is, $TCI_{i,1}$ and $TCI_{i,2}$ correspond to a TCI codepoint i. Therefore, the second indication information includes N+1 indication fields, i.e., $C_0$, $C_1$, . . . , $C_{N-1}$, $C_N$. An $i^{th}$ indication field is configured to indicate that an $i^{th}$ transmission configuration indicator codepoint corresponds to a joint transmission configuration indicator or a separate transmission configuration indicator. For example, if $C_i$ is displayed as "0", it means that a TCI corresponding to a TCI codepoint i is a joint TCI, if $C_i$ is displayed as "1", it means that the TCI corresponding to the TCI codepoint i is a separate TCI. Alternatively, for example, if $C_i$ is displayed as "1", it means that the TCI corresponding to the TCI codepoint i is a joint TCI, if $C_i$ is displayed as "0", it means that the TCI corresponding to the TCI codepoint i is a separate TCI. If the terminal device receives the second indication information, the terminal determines that each element in the TCI codepoints, i.e., each TCI codepoint, corresponds to a separate transmission configuration indicator or a joint transmission configuration indicator. The separate transmission configuration indicator includes at least one of a separate uplink transmission configuration indicator or a separate downlink transmission configuration indicator.

In the above embodiments provided by the present disclosure, the methods provided in embodiments of the present disclosure are introduced from perspectives of the network device and the terminal device respectively. In order to implement the various functions in the methods according to the above embodiments of the present disclosure, the network device and the terminal device each may include a hardware structure and a software module, and implement the above various functions in a form of the hardware structure, the software module, or the hardware structure plus the software module. A certain function among the above mentioned various functions may be implemented in the form of the hardware structure, the software module, or the hardware structure plus the software module.

Figure 4:
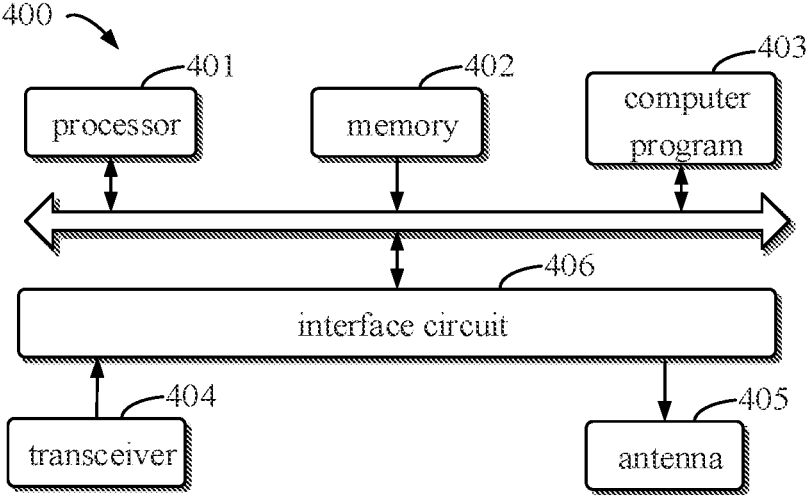
FIG. 4 is a schematic diagram of a communication device according to embodiments of the present disclosure.

Referring to FIG. 4, FIG. 4 is a schematic block diagram of another communication device 400 according to embodiments of the present disclosure. The communication device 400 may be a network device, may also be a terminal device (such as the terminal device as described in the above method embodiments), may also be a chip, a chip system, or a processor that supports the network device to implement the above method, or may also be a chip, a chip system, or a processor that supports the terminal device to implement the above method. The device may be used to implement the methods as described in the above method embodiments, and for details, reference may be made to the descriptions on the above method embodiments.

The communication device 400 may include one or more processors 401. The processor 401 may be a general-purpose processor or a special-purpose processor. For example, it may be a baseband processor or a central processing unit. The baseband processor may be configured to process a communication protocol and communication data, and the central processing unit may be configured to control a communication device (such as a base station, a baseband chip, a terminal device, a terminal device chip, a DU or a CU, etc.), execute computer programs, and process data of computer programs.

In some embodiments, the communication device 400 may further include one or more memories 402 that may have stored therein a computer program 403. The processor 401 executes the computer program 403 to cause the communication device 400 to implement the methods as described in the above method embodiments. In some embodiments, the memory 402 may have stored therein data. The communication device 400 and the memory 402 may be set separately or integrated together.

In some embodiments, the communication device 400 may further include a transceiver 404 and an antenna 405. The transceiver 404 may be called a transceiving element, a transceiving machine, a transceiving circuit or the like, for implementing a transceiving function. The transceiver 404 may include a receiver and a transmitter. The receiver may be called a receiving machine, a receiving circuit or the like, for implementing a receiving function. The transmitter may be called a sending machine, a sending circuit or the like for implementing a sending function.

In some embodiments, the communication device 400 may further include one or more interface circuits 406. The interface circuit 406 is configured to receive a code instruction and transmit the code instruction to the processor 401. The processor 401 runs the code instruction to enable the communication device 400 to execute the methods as described in the foregoing method embodiments.

When the communication device 400 is the terminal device (such as the terminal device as described in the above method embodiments), the processor 401 is configured to execute the steps S201 and S202 in FIG. 2: any one of the steps A1 and A2, or any one of the steps B1, B2, and B3.

When the communication device 400 is the network device, the transceiver 404 is configured to execute the method for configuring a transmission configuration indicator (TCI) state as performed by the network device.

In an implementation, the processor 401 may include the transceiver configured to implement receiving and sending functions. For example, the transceiver may be a transceiving circuit, an interface, or an interface circuit. The transceiving circuit, the interface or the interface circuit configured to implement the receiving and sending functions may be separated or may be integrated together. The above transceiving circuit, interface or interface circuit may be configured to read and write codes/data, or the above transceiving circuit, interface or interface circuit may be configured to transmit or transfer signals.

In an implementation, the processor 401 may have stored therein a computer program 403 that, when run on the processor 401, causes the communication device 400 to implement the method as described in the foregoing method embodiments. The computer program 403 may be solidified in the processor 401, and in this case, the processor 401 may be implemented by a hardware.

In an implementation, the communication device 400 may include a circuit, and the circuit may implement the sending, receiving or communicating function in the foregoing method embodiments. The processor and the transceiver described in the present disclosure may be implemented on an integrated circuit (IC), an analog IC, a radio frequency integrated circuit (RFIC), a mixed-signal IC, an application specific integrated circuit (ASIC), a printed circuit board (PCB), an electronic device, etc. The processor and the transceiver may also be manufactured using various IC process technologies, such as a complementary metal oxide semiconductor (CMOS), an nMetal-oxide-semiconductor (NMOS), a P-type metal oxide semiconductor (PMOS), a bipolar junction transistor (BJT), a bipolar CMOS (BiC-MOS), silicon germanium (SiGe), gallium arsenide (GaAs), etc.

The communication device described in the above embodiments may be the network device or the terminal device (such as the terminal device in the foregoing method embodiments), but the scope of the communication device described in the present disclosure is not limited thereto, and a structure of the communication device is not limited by FIG. 4. The communication device may be a stand-alone device or may be a part of a larger device. For example, the communication device may be:

(1) a stand-alone integrated circuit (IC), or a chip, or a chip system or a subsystem:

(2) a set of one or more ICs, In some embodiments, the set of ICs may also include a storage component for storing data and computer programs:

(3) an ASIC, such as a modem:

(4) a module that may be embedded in other devices:

(5) a receiver, a terminal device, an intelligent terminal device, a cellular phone, a wireless device, a handheld machine, a mobile unit, a vehicle device, a network device, a cloud device, an artificial intelligence device, etc.:

(6) others.

Figure 5:
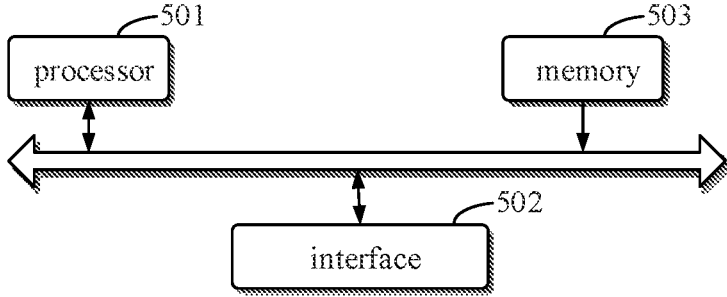
FIG. 5 is a schematic diagram of a chip according to embodiments of the present disclosure.

For the case where the communication device may be a chip or a chip system, reference may be made to a schematic structural diagram of a chip shown in FIG. 5. The chip shown in FIG. 5 includes a processor 501 and an interface 502. In the chip, one or more processors 501 may be provided, and more than one interface 502 may be provided.

For the case where the chip is used to implement functions of the terminal device (such as the terminal device as described in the above embodiments) in embodiments of the present disclosure, the interface 502 is configured to execute the steps S201 and S202 in FIG. 2: the steps S301 and S302 in FIG. 3: any one of the steps A1 and A2, or any one of the steps B1, B2, and B3.

For the case where the chip is used to implement functions of the network device in embodiments of the present disclosure, the interface 502 is configured to execute the method for configuring a transmission configuration indicator (TCI) state as performed by the network device.

In some embodiments, the chip further includes a memory 503 for storing necessary computer programs and data.

Those skilled in the art may also understand that various illustrative logical blocks and steps listed in embodiments of the present disclosure may be implemented by an electronic hardware, a computer software, or a combination thereof. Whether such functions are implemented by a hardware or a software depends on specific applications and design requirements of an overall system. For each specific application, those skilled in the art may use various methods to implement the described functions, but such implementation should not be understood as beyond the protection scope of embodiments of the present disclosure.

Embodiments of the present disclosure also provide a system for configuring a transmission configuration indicator (TCI) state. The system includes the communication device as the terminal device (such as the terminal device in the foregoing method embodiments) and the communication device as the network device as described in the aforementioned embodiments of FIG. 5, or the system includes the communication device as the terminal device (such as the terminal device in the foregoing method embodiments) and the communication device as the network device as described in the aforementioned embodiments of FIG. 4.

The present disclosure also provides a readable storage medium having stored therein instructions that, when executed by a computer, cause functions of any of the above method embodiments to be implemented.

The present disclosure also provides a computer program product that, when executed by a computer, causes functions of any of the above method embodiments to be implemented.

The above embodiments may be implemented in whole or in part by a software, a hardware, a firmware or any combination thereof. When implemented using the software, the above embodiments may be implemented in whole or in part in a form of the computer program product. The computer program product includes one or more computer programs. When the computer program is loaded and executed on the computer, all or part of the processes or functions according to embodiments of the present disclosure will be generated. The computer may be a general purpose computer, a special purpose computer, a computer network, or other programmable devices. The computer program may be stored in a computer-readable storage medium or transmitted from one computer-readable storage medium to another computer-readable storage medium. For example, the computer program may be transmitted from one website site, computer, server or data center to another website site, computer, server or data center in a wired manner (such as via a coaxial cable, an optical fiber, a digital subscriber line (DSL)) or a wireless manner (such as via infrared, wireless, or microwave, etc.). The computer-readable storage medium may be any available medium that can be accessed by the computer, or a data storage device such as a server or a data center integrated by one or more available media. The available medium may be a magnetic medium (for example, a floppy disk, a hard disk, or a magnetic tape), an optical medium (for example, a high-density digital video disc (DVD)), or a semiconductor medium (for example, a solid state disk (SSD)) etc.

Those of ordinary skill in the art can understand that the first, second, and other numeral numbers involved in the present disclosure are only for convenience of description, and are not intended to limit the scope of embodiments of the present disclosure, nor are they intended to represent a sequential order.

The term "at least one" used in the present disclosure may also be described as one or more, and the term "a plurality of" may cover two, three, four or more, which are not limited in the present disclosure. In embodiments of the present disclosure, for a certain kind of technical features, the technical features in this kind of technical features are distinguished by terms like "first", "second", "third", "A", "B", "C" and "D", etc., and these technical features described with the "first", "second", "third", "A", "B", "C" and "D" have no order of priority and have no order of size.

The correspondence shown in each table in the present disclosure may be configured or predefined. The values of various information in each table are just examples, and may be configured as other values, which are not limited in the present disclosure. When configuring a correspondence between the information and various parameters, it is not necessary to configure all the correspondences shown in the tables. For example, the correspondences shown in some rows of a table in the present disclosure may not be configured. For another example, appropriate deformations or adjustments (such as splitting, merging, and so on) can be made based on the above table. The names of parameters shown in the titles of the above tables may also adopt other names understandable by the communication device, and the values or representations of the parameters may also be other values or representations understandable by the communication device. When the above tables are implemented, other data structures may also be used, for example, arrays, queues, containers, stacks, linear tables, pointers, linked lists, trees, graphs, structural body, classes, heaps, or hash tables may be used.

The term "predefinition" in the present disclosure may be understood as definition, definition in advance, storage, pre-storage, pre-negotiation, pre-configuration, curing, or pre-firing.

Those of ordinary skill in the art can appreciate that the units and algorithm steps of various examples described in conjunction with embodiments disclosed herein may be implemented by the electronic hardware, or a combination of the computer software and the electronic hardware. Whether these functions are executed by the hardware or the software depends on the specific applications and design constraints of the technical solution. For each particular application, those skilled in the art may use different methods to implement the described functions, but such implementation should not be considered beyond the scope of the present disclosure.

Those skilled in the art can clearly understand that for the convenience and brevity of the description, the specific working process of the above-described system, device and unit may refer to the corresponding process in the foregoing method embodiments, which will not be repeated here.

The above only describes some specific implementations of the present disclosure, but the protection scope of the present disclosure is not limited thereto. Any changes or substitutions that are conceivable to those skilled in the art within the technical scope of the present disclosure should fall within the protection scope of the present disclosure. Therefore, the protection scope of the present disclosure should be determined by the protection scope of the claims.

What is claimed is:

1. A method for configuring a transmission configuration indicator (TCI) state, performed by a terminal device, comprising:

receiving configuration information sent by a network device, wherein the configuration information comprises at least one transmission configuration indicator state corresponding to at least one transmission configuration indicator codepoint; and acquiring a transmission configuration indicator state corresponding to a communication transmission according to the transmission configuration indicator codepoint;

wherein the configuration information further comprises: first indication information, configured to indicate that all elements in the at least one transmission configuration indicator codepoint correspond to joint transmission configuration indicators, or configured to indicate that all elements in the at least one transmission configuration indicator codepoint correspond to separate transmission configuration indicators; and wherein a separate transmission configuration indicator comprises at least one of a separate uplink transmission configuration indicator or a separate downlink transmission configuration indicator.

2. The method according to claim 1, wherein the configuration information further comprises: second indication information, configured to indicate that each element in the at least one transmission configuration indicator codepoint corresponds to a joint transmission configuration indicator or a separate transmission configuration indicator, wherein the separate transmission configuration indicator comprises at least one of a separate uplink transmission configuration indicator or a separate downlink transmission configuration indicator.

3. The method according to claim 1, wherein acquiring the transmission configuration indicator state corresponding the communication transmission according to the transmission configuration indicator codepoint comprises:

acquiring the transmission configuration indicator state according to the first indication information.

4. The method according to claim 3, wherein acquiring the transmission configuration indicator state according to the first indication information comprises:

acquiring the transmission configuration indicator state according to the first indication information, and at least one of a first transmission configuration indication field, a second transmission configuration indication field, a first information indication field or a second information indication field corresponding to a first codepoint.

5. The method according to claim 4, wherein acquiring the transmission configuration indicator state according to the first indication information, and at least one of the first transmission configuration indication field, the second transmission configuration indication field, the first information indication field or the second information indication field corresponding to the first codepoint comprises one of:

determining that the first codepoint corresponds to the joint transmission configuration indicator according to the first indication information, determining that the first information indication field corresponding to the first transmission configuration indication field included in the first codepoint indicates that the first transmission configuration indication field is in a displayed state, determining that the second information indication field corresponding to the second transmission configuration indication field included in the first codepoint indicates that the second transmission configuration indication field is in a non-displayed state, and acquiring the transmission configuration indicator state according to a first transmission configuration indicator state displayed in the first transmission configuration indication field; or determining that the first codepoint corresponds to the joint transmission configuration indicator according to the first indication information, determining that the first information indication field corresponding to the first transmission configuration indication field included in the first codepoint indicates that the first transmission configuration indication field is in a non-displayed state, determining that the second information indication field corresponding to the second transmission configuration indication field included in the first codepoint indicates that the second transmission configuration indication field is in a displayed state, and acquiring the transmission configuration indicator state according to a second transmission configuration indicator state displayed in the second transmission configuration indication field.

6. The method according to claim 5, wherein the first transmission configuration indicator state or the second transmission configuration indicator state is a transmission configuration indicator state in a joint transmission configuration indicator state pool, and the transmission configuration indicator state in the joint transmission configuration indicator state pool is applicable to an uplink communication transmission and a downlink communication transmission.

7. The method according to claim 4, wherein acquiring the transmission configuration indicator state according to the first indication information, and at least one of the first transmission configuration indication field, the second transmission configuration indication field, the first information indication field or the second information indication field corresponding to the first codepoint comprises one of:

determining that the first codepoint corresponds to the separate transmission configuration indicator according to the first indication information, determining that the first information indication field corresponding to the first transmission configuration indication field included in the first codepoint indicates that the first transmission configuration indication field is in a displayed state, determining that the second information indication field corresponding to the second transmission configuration indication field included in the first codepoint indicates that the second transmission configuration indication field is in a non-displayed state, and acquiring the transmission configuration indicator state according to a first transmission configuration indicator state displayed in the first transmission configuration indication field;

determining that the first codepoint corresponds to the separate transmission configuration indicator according to the first indication information, determining that the first information indication field corresponding to the first transmission configuration indication field included in the first codepoint indicates that the first transmission configuration indication field is in a non-displayed state, determining that the second information indication field corresponding to the second transmission configuration indication field included in the first codepoint indicates that the second transmission configuration indication field is in a displayed state, and acquiring the transmission configuration indicator state according to a second transmission configuration indicator state displayed in the second transmission configuration indication field; or determining that the first codepoint corresponds to the separate transmission configuration indicator according to the first indication information, determining that the first information indication field corresponding to the first transmission configuration indication field included in the first codepoint indicates that the first transmission configuration indication field is in a displayed state, determining that the second information indication field corresponding to the second transmission configuration indication field included in the first codepoint indicates that the second transmission configuration indication field is in a displayed state, and acquiring the transmission configuration indicator state according to a first transmission configuration indicator state displayed in the first transmission configuration indication field and a second transmission configuration indicator state displayed in the second transmission configuration indication field.

8. The method according to claim 7, wherein the first transmission configuration indicator state is a transmission configuration indicator state in a separate downlink transmission configuration indicator state pool, and the second transmission configuration indicator state is a transmission configuration indicator state in a separate uplink transmission configuration indicator state pool, and wherein the transmission configuration indicator state in the separate downlink transmission configuration indicator state is applicable to a downlink communication transmission, and the transmission configuration indicator state in the separate uplink transmission configuration indicator state pool is applicable to an uplink communication transmission; or wherein the first transmission configuration indicator state is a transmission configuration indicator state in a separate uplink transmission configuration indicator state pool, and the second transmission configuration indicator state is a transmission configuration indicator state in a separate downlink transmission configuration indicator state pool.

9. The method according to claim 1, wherein the communication transmission comprises at least one of a downlink communication transmission or an uplink communication transmission, wherein the downlink communication transmission comprises at least one of: a physical downlink control channel (PDCCH) transmission, a physical downlink shared channel (PDSCH) transmission, a physical broadcast channel (PBCH) transmission, a synchronization signal block (SSB) transmission, a channel state information reference signal (CSI-RS) transmission, a demodulation reference signal (DMRS) transmission, or a positioning reference signal (PRS) transmission; and wherein the uplink communication transmission comprises at least one of: a physical uplink control channel (PUCCH) transmission, a physical uplink shared channel (PUSCH) transmission, a physical random access channel (PRACH) transmission, a sounding reference signal (SRS) transmission, or a demodulation reference signal (DMRS) transmission.

10. The method according to claim 1, wherein a separate downlink transmission configuration indicator state pool, a separate uplink transmission configuration indicator state pool, and a joint transmission configuration indicator state pool are different from one another, or at least two of a separate downlink transmission configuration indicator state pool, a separate uplink transmission configuration indicator state pool, and a joint transmission configuration indicator state pool are the same.

11. The method according to claim 1, wherein the configuration information comprises a media access control (MAC) control element (CE).

12. The method according to claim 1, wherein acquiring the transmission configuration indicator state corresponding the communication transmission according to the transmission configuration indicator codepoint comprises:

receiving downlink control information (DCI) from the network device, and determining the transmission configuration indicator codepoint according to the DCI.

13. A method for configuring a transmission configuration indicator (TCI) state, performed by a network device, comprising:

sending configuration information to a terminal device, wherein the configuration information comprises at least one transmission configuration indicator state corresponding to at least one transmission configuration indicator codepoint;

wherein the configuration information further comprises first indication information, wherein the first indication information is configured to indicate that all elements in the at least one transmission configuration indicator codepoint correspond to joint transmission configuration indicators, or the first indication information is configured to indicate that all elements in the at least one transmission configuration indicator codepoint correspond to separate transmission configuration indicators; and wherein a separate transmission configuration indicator comprises at least one of a separate uplink transmission configuration indicator or a separate downlink transmission configuration indicator.

14. The method according to claim 13, wherein the configuration information further comprises second indication information, wherein the second indication information is configured to indicate that each element in the at least one transmission configuration indicator codepoint corresponds to a joint transmission configuration indicator or a separate transmission configuration indicator, wherein the separate transmission configuration indicator comprises at least one of a separate uplink transmission configuration indicator or a separate downlink transmission configuration indicator.

15. A communication device, comprising:

a processor; and a memory, having stored therein a computer program, wherein the processor is configured to:

receive configuration information sent by a network device, wherein the configuration information comprises at least one transmission configuration indicator state corresponding to at least one transmission configuration indicator codepoint; and acquire a transmission configuration indicator state corresponding to a communication transmission according to the transmission configuration indicator codepoint;

wherein the configuration information further comprises:

first indication information, configured to indicate that all elements in the at least one transmission configuration indicator codepoint correspond to joint transmission configuration indicators, or configured to indicate that all elements in the at least one transmission configuration indicator codepoint correspond to separate transmission configuration indicators; and wherein a separate transmission configuration indicator comprises at least one of a separate uplink transmission configuration indicator or a separate downlink transmission configuration indicator.

16. A communication device, comprising:

a processor; and a memory, having stored therein a computer program, wherein the processor is configured to perform the method according to claim 15.

17. A non-transitory computer-readable storage medium having stored therein an instruction that, when executed by a processor, causes the processor to perform the method according to claim 1.

18. A non-transitory computer-readable storage medium having stored therein an instruction that, when executed by a processor, causes the processor to perform the method according to claim 13.

19. The communication device according to claim 15, wherein the processor is further configured to:

acquire the transmission configuration indicator state according to the first indication information, and at least one of a first transmission configuration indication field, a second transmission configuration indication field, a first information indication field or a second information indication field corresponding to a first codepoint.

20. The communication device according to claim 19, wherein the processor is further configured to perform one of:

determining that the first codepoint corresponds to the joint transmission configuration indicator according to the first indication information, determining that the first information indication field corresponding to the first transmission configuration indication field included in the first codepoint indicates that the first transmission configuration indication field is in a displayed state, determining that the second information indication field corresponding to the second transmission configuration indication field included in the first codepoint indicates that the second transmission configuration indication field is in a non-displayed state, and acquiring the transmission configuration indicator state according to a first transmission configuration indicator state displayed in the first transmission configuration indication field;

determining that the first codepoint corresponds to the joint transmission configuration indicator according to the first indication information, determining that the first information indication field corresponding to the first transmission configuration indication field included in the first codepoint indicates that the first transmission configuration indication field is in a non-displayed state, determining that the second information indication field corresponding to the second transmission configuration indication field included in the first codepoint indicates that the second transmission configuration indication field is in a displayed state, and acquiring the transmission configuration indicator state according to a second transmission configuration indicator state displayed in the second transmission configuration indication field;

determining that the first codepoint corresponds to the separate transmission configuration indicator according to the first indication information, determining that the first information indication field corresponding to the first transmission configuration indication field included in the first codepoint indicates that the first transmission configuration indication field is in a displayed state, determining that the second information indication field corresponding to the second transmission configuration indication field included in the first codepoint indicates that the second transmission configuration indication field is in a non-displayed state, and acquiring the transmission configuration indicator state according to a first transmission configuration indicator state displayed in the first transmission configuration indication field;

determining that the first codepoint corresponds to the separate transmission configuration indicator according to the first indication information, determining that the first information indication field corresponding to the first transmission configuration indication field included in the first codepoint indicates that the first transmission configuration indication field is in a non-displayed state, determining that the second information indication field corresponding to the second transmission configuration indication field included in the first codepoint indicates that the second transmission configuration indication field is in a displayed state, and acquiring the transmission configuration indicator state according to a second transmission configuration indicator state displayed in the second transmission configuration indication field; or determining that the first codepoint corresponds to the separate transmission configuration indicator according to the first indication information, determining that the first information indication field corresponding to the first transmission configuration indication field included in the first codepoint indicates that the first transmission configuration indication field is in a displayed state, determining that the second information indication field corresponding to the second transmission configuration indication field included in the first codepoint indicates that the second transmission configuration indication field is in a displayed state, and acquiring the transmission configuration indicator state according to a first transmission configuration indicator state displayed in the first transmission configuration indication field and a second transmission configuration indicator state displayed in the second transmission configuration indication field.

* * * * *